United States Patent
Seong et al.

(10) Patent No.: US 11,010,029 B2
(45) Date of Patent: May 18, 2021

(54) DISPLAY APPARATUS AND METHOD OF DISPLAYING IMAGE BY DISPLAY APPARATUS

(71) Applicant: Samsung Electronics Co., Ltd., Suwon-si (KR)

(72) Inventors: Young-ah Seong, Seoul (KR); Chan-hong Min, Yongin-si (KR); Pil-seung Yang, Seoul (KR); Say Jang, Yongin-si (KR); Jae-eun Kang, Suwon-si (KR); Yong-hyun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/572,043

(22) Filed: Dec. 16, 2014

(65) Prior Publication Data
US 2015/0177962 A1 Jun. 25, 2015

(30) Foreign Application Priority Data

Dec. 19, 2013 (KR) .................. 10-2013-0159693
Jul. 2, 2014 (KR) .................. 10-2014-0082664

(51) Int. Cl.
*G06F 3/0484* (2013.01)
*G06F 3/0488* (2013.01)

(52) U.S. Cl.
CPC ........ *G06F 3/04845* (2013.01); *G06F 3/0488* (2013.01); *G06F 2203/0339* (2013.01)

(58) Field of Classification Search
CPC combination set(s) only.
See application file for complete search history.

(56) References Cited

U.S. PATENT DOCUMENTS

| 7,656,393 | B2 | 2/2010 | King et al. |
| 8,856,678 | B1 * | 10/2014 | Cho ............. G06F 3/0488 715/784 |
| 9,323,427 | B2 | 4/2016 | Yu et al. |
| 10,133,459 | B2 | 11/2018 | Andreasson et al. |

(Continued)

FOREIGN PATENT DOCUMENTS

| CN | 103250123 A | 8/2013 |
| JP | 2000-137563 A | 5/2000 |

(Continued)

OTHER PUBLICATIONS

CN Office Action dated Jan. 18, 2019 issued in CN Patent Application No. 201480073456.9.

(Continued)

*Primary Examiner* — Matthew Ell
(74) *Attorney, Agent, or Firm* — Jefferson IP Law, LLP

(57) ABSTRACT

A display apparatus and a method of displaying an image by the display apparatus are provided. The display apparatus and the method include displaying a first content image on the display apparatus, detecting a first touch from a bezel of the display apparatus, displaying a folding area on a first edge of the first content image in response to a location of the first touch, and moving the first content image to the folding area from an adjacent folding area of the first content image, which contacts the folding area, in response to holding time of the first touch.

21 Claims, 31 Drawing Sheets

(56) References Cited

U.S. PATENT DOCUMENTS

| | | | |
|---|---|---|---|
| 2002/0118230 A1 | 8/2002 | Card et al. | |
| 2003/0163525 A1* | 8/2003 | Hendriks | G06Q 10/10 709/204 |
| 2005/0168441 A1* | 8/2005 | Obitsu | G06F 3/0485 345/157 |
| 2006/0053385 A1* | 3/2006 | Van Leeuwen | G06F 3/0481 715/767 |
| 2006/0197750 A1* | 9/2006 | Kerr | G06F 1/1626 345/173 |
| 2006/0238517 A1* | 10/2006 | King | G06F 1/1626 345/173 |
| 2008/0259057 A1* | 10/2008 | Brons | G06F 1/1626 345/184 |
| 2009/0002335 A1* | 1/2009 | Chaudhri | G06F 3/04815 345/173 |
| 2009/0109243 A1* | 4/2009 | Kraft | G06F 3/0481 345/660 |
| 2009/0295753 A1* | 12/2009 | King | G06F 1/1626 345/174 |
| 2011/0063234 A1* | 3/2011 | Liu | G06F 3/0488 345/173 |
| 2011/0209098 A1* | 8/2011 | Hinckley | G06F 3/0483 715/863 |
| 2011/0209099 A1 | 8/2011 | Hinckley et al. | |
| 2011/0210913 A1* | 9/2011 | Hu | G09G 3/008 345/156 |
| 2012/0144342 A1* | 6/2012 | Yu | G06F 3/0482 715/830 |
| 2012/0154408 A1 | 6/2012 | Yukawa et al. | |
| 2012/0218208 A1* | 8/2012 | Sato | G06F 3/04883 345/173 |
| 2013/0159915 A1 | 6/2013 | Kim et al. | |
| 2013/0194269 A1 | 8/2013 | Matas et al. | |
| 2013/0346915 A1* | 12/2013 | Kuehnle | G06F 3/0485 715/799 |
| 2014/0062976 A1* | 3/2014 | Park | G06F 1/1626 345/204 |
| 2014/0189551 A1* | 7/2014 | Kim | G06F 3/04817 715/765 |
| 2014/0362119 A1* | 12/2014 | Freund | G06F 3/017 345/661 |

FOREIGN PATENT DOCUMENTS

| | | |
|---|---|---|
| JP | 2008234372 A * | 10/2008 |
| KR | 10-2008-0041809 A | 5/2008 |
| KR | 10-2011-0110944 A | 10/2011 |
| KR | 10-2011-0122897 A | 11/2011 |
| KR | 10-2013-0094573 A | 8/2013 |
| WO | 2008/119149 A1 | 10/2008 |
| WO | 2012120978 A1 | 9/2012 |

OTHER PUBLICATIONS

EP Examination Report dated Mar. 21, 2019 issued in EP Patent Application No. 14871617.8.
Chinese Office Action dated Oct. 12, 2019, issued in Chinese Application No. 201480073456.9.
Chinese Office Action with English translation dated May 14, 2019; Chinese Appln. No. 201480073456.9.
Chinese Office Action with English translation dated Apr. 1, 2020; Chinese Application No. 201480073456.9.
India Examination Report dated Feb. 17, 2020; India Application No. 201617023244.
Korean Office Action with English translation dated Dec. 16, 2020; Korean Appln. No. 10-2014-0082664.

* cited by examiner

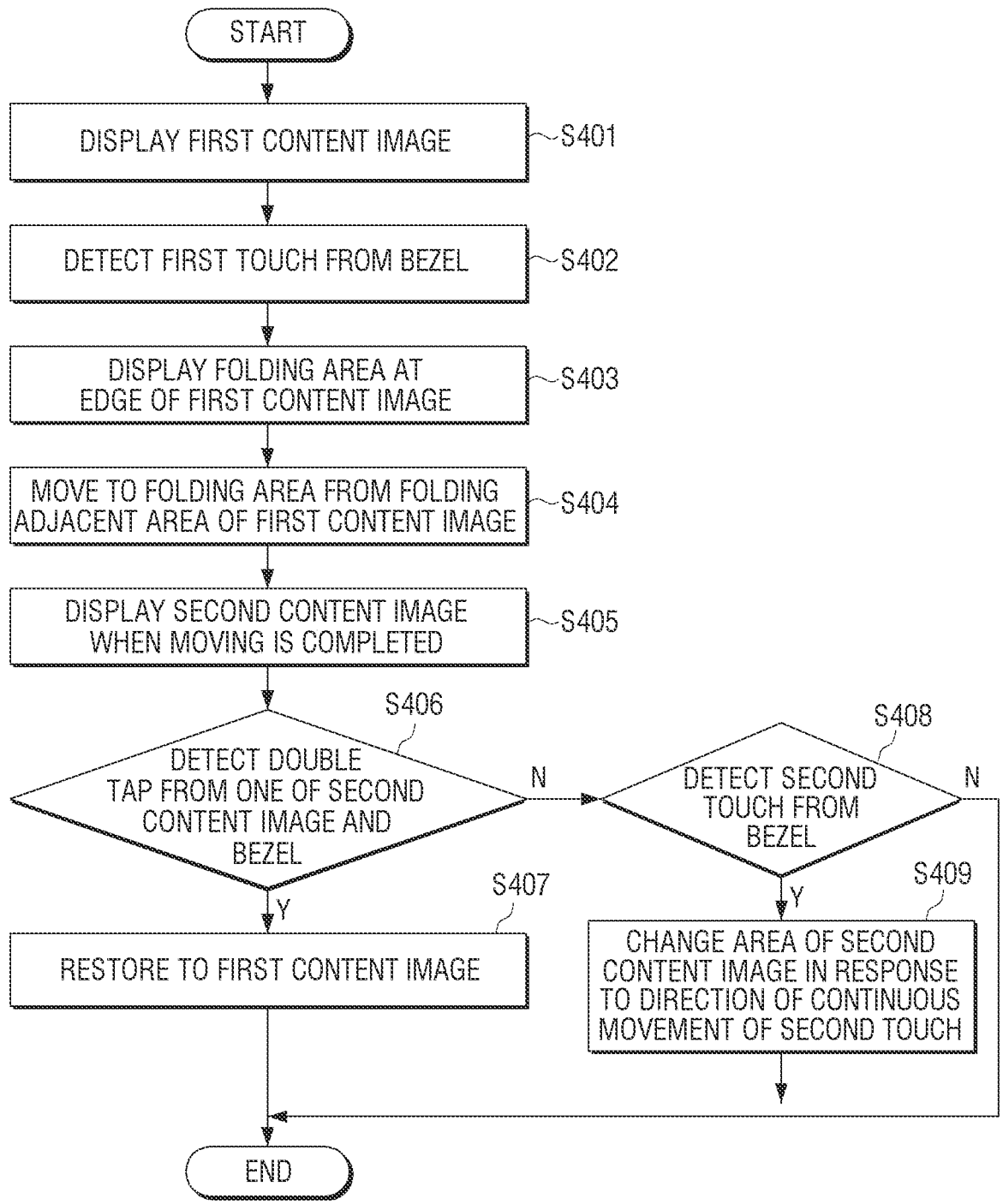

DISPLAY APPARATUS AND METHOD OF DISPLAYING IMAGE BY DISPLAY APPARATUS

CROSS-REFERENCE TO RELATED APPLICATION(S)

This application claims the benefit under 35 U.S.C. § 119(a) of a Korean patent application filed on Dec. 19, 2013 in the Korean Intellectual Property Office and assigned Serial number 10-2013-0159693, and a Korean patent application filed on Jul. 2, 2014 in the Korean Intellectual Property Office and assigned Serial number 10-2014-0082664, the entire disclosure of each of which is hereby incorporated by reference.

TECHNICAL FIELD

The present disclosure relates to a display apparatus and a method of displaying an image by the display apparatus. More particularly, the present disclosure relates to a display apparatus and a method of displaying an image by the display apparatus, which controls a displayed content image using a touch sensor positioned in a bezel of the display apparatus.

BACKGROUND

Currently, various services and functions provided by a display apparatus have been extensively used. In addition, a large size display apparatus has been extensively used and has been used in school, at work, by government, and the like.

When teachers lecture using lecture material via a display apparatus, they may write on a whiteboard. Upon writing on the display apparatus, the teacher may not intuitively differentiate the writing on the display apparatus from manipulation of page transfer or page turn, and thus, the lecture material may be unintentionally selected or a page may be unintentionally transferred. In addition, when the teacher writes on the whiteboard using a large size display apparatus, they may move the lecture material to the right or left on the display apparatus to a desired point and make writing on the whiteboard on the display apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described above. Also, the present disclosure is not required to overcome the disadvantages described above, and an embodiment of the present disclosure may not overcome any of the problems described above.

In accordance with an aspect of the present disclosure, a method of displaying an image by a display apparatus is provided. The method includes displaying a first content image on the display apparatus, detecting a first touch from a bezel of the display apparatus, displaying a folding area on a first edge of the first content image in response to a location of the first touch, and moving the first content image to the folding area from an adjacent folding area of the first content image, which contacts the folding area, in response to holding time of the first touch.

In accordance with another aspect of the present disclosure, a method of displaying an image by a display apparatus is provided. The method includes displaying a first content image on the display apparatus, detecting a first touch from a bezel of the display apparatus, displaying a folding area on a first edge of the first content image in response to a location of the first touch, moving the first content image to the folding area from an adjacent folding area of the first content image, which contacts the folding area, in response to continuous movement of the first touch, and displaying a second content image when the moving is completed.

In accordance with another aspect of the present disclosure, a display apparatus is provided. The display apparatus includes a display unit configured to display a first content image, a bezel surrounding the display unit and including a bezel touch sensor, and a control unit configured to control the display unit and the bezel touch sensor. The control unit displays a folding area at an edge of the first content image in response to a first touch detected via the bezel touch sensor, and moves the first content image to the folding area from an adjacent folding area of the first content image, which contacts the folding area, in response to holding time of the first touch.

In accordance with another aspect of the present disclosure, a display apparatus is provided. The display apparatus includes a display unit configured to display a first content image, a bezel surrounding the display unit and including a bezel touch sensor, and a control unit configured to control the display unit and the bezel touch sensor. The control unit displays a folding area at an edge of the first content image in response to first touch detected via the bezel touch sensor, and moves the first content image to the folding area from an adjacent folding area of the first content image, which contacts the folding area, in response to continuous movement of the first touch.

In accordance with another aspect of the present disclosure, a method of displaying an image by a display apparatus is provided. The method includes displaying an eleventh content image on a display apparatus, detecting an eleventh touch from a bezel of the display apparatus, displaying a folding area which divides the eleventh content image into a plurality of sub content images on the eleventh content image in response to a location of the eleventh touch, detecting a twelfth touch from a bezel, and moving one sub content image from among the plurality of sub content images to the folding area from an adjacent folding area which is in contact with the folding area, in response to holding time of the twelfth touch.

In accordance with another aspect of the present disclosure, a display apparatus is provided. The display apparatus includes a display unit configured to display an eleventh content image, a bezel surrounding the display unit and comprising a bezel touch sensor, and a control unit configured to control the display unit and the bezel touch sensor. The control unit displays a folding area which divides the eleventh content image into a plurality of sub content images on the eleventh content image, in response to a location of the eleventh touch which is detected through the bezel touch sensor, and moves one sub content image from among the plurality of sub content images to the folding area from an adjacent folding area which is in contact with the folding area, in response to holding time of the twelfth touch.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a schematic flowchart of a method of displaying an image by a display apparatus according to an embodiment of the present disclosure;

Throughout the drawings, it should be noted that like reference numbers are used to depict the same or similar elements, features, and structures

DETAILED DESCRIPTION

Figure 1:
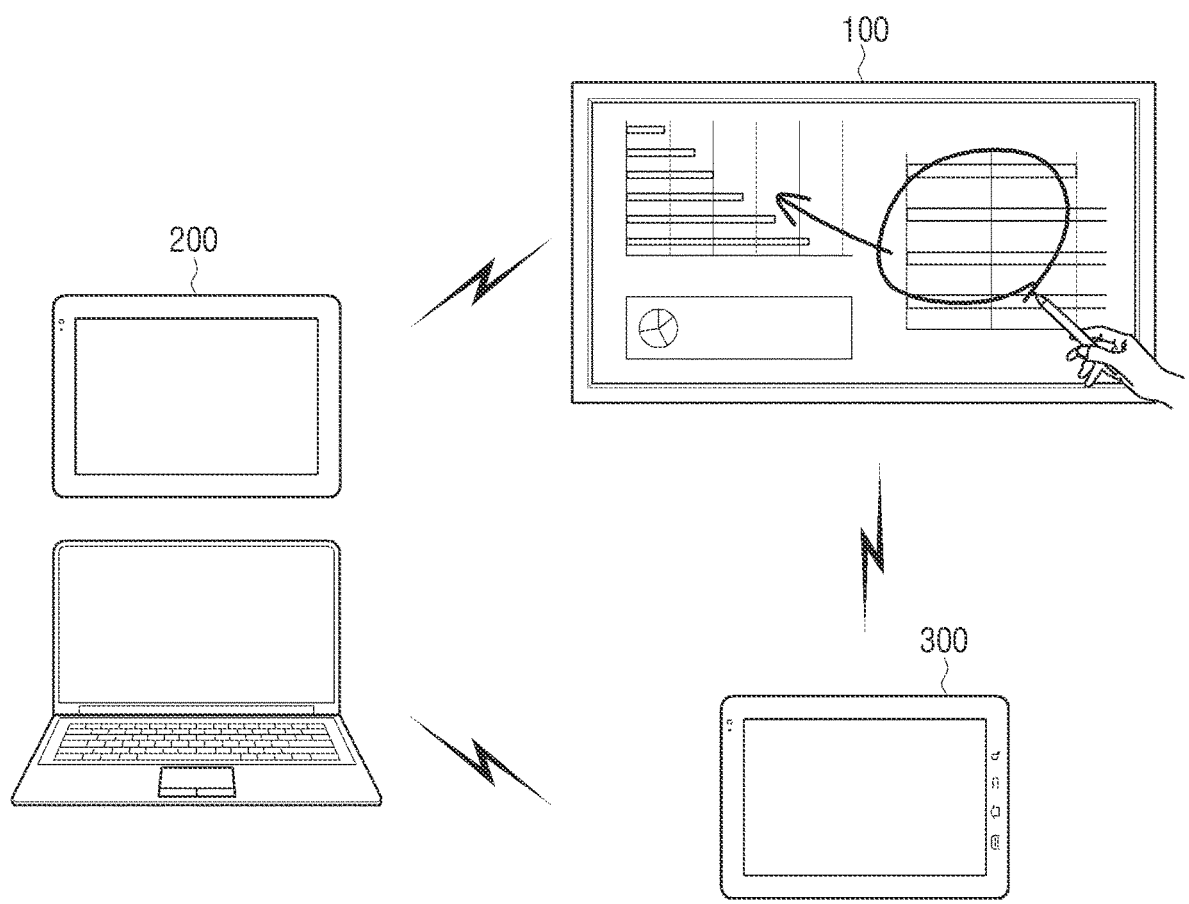
FIG. 1 is a schematic diagram illustrating connection between a display apparatus and a User Equipment (UE) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It will be understood that the singular forms "a," "an," and "the" include plural referents unless the context clearly dictates otherwise. Thus, for example, reference to "a component surface" includes reference to one or more of such surfaces.

An application refers to software that is executed on a computer Operating System (OS) or a mobile OS and is directly used by a user. For example, the application may include, for example, a word processor, a spread sheet, a Social Network System (SNS), chatting, a map, a music player, and a moving picture player.

Drag refers to an operation of touching a screen by a user finger and/or other various forms of input units and moving the finger or the input unit to another point while the touch is maintained. According to the drag, a selected object may be moved. In addition, when an object within an image is not selected and a background portion is touched and dragged, the image is transferred and/or another image is displayed according to the drag.

Flick refers to a dragging operation at a threshold velocity (e.g., 100 pixel/s) or more using a user finger or an input unit. A display apparatus may compare a moving speed of the finger or the input unit with the threshold speed (e.g., 100 pixel/s) to differentiate drag and flick. That is, when the finger and/or the input unit is moved at greater than a threshold speed, the operation may be determined as flick, and when the finger or the input unit is moved at a speed less than the threshold speed, the operation may be determined as drag.

Drag & drop refers to an operation for dragging an object selected using a user finger and/or an input unit to another point within a screen and putting the dragged object on the point. The selected object is moved to another point according to drag & drop.

Tap refers to an operation of quickly touching a screen using a user finger or an input unit. The tap operation corresponds to a case in which a time difference between a point of time when a touch and/or a touch element contacts the screen and a point of time when the finger and/or the touch element are moved from the screen after touching is very short.

Double tap refers to an operation of quickly touching a screen twice using a user finger and/or an input unit. The double tap operation corresponds to a case in which a time difference between a point of time when a touch or a touch element contacts the screen and a point of time when the finger or the touch element are moved from the screen after touching is very short. Throughout this specification, various gestures such as drag, flick, drag & drop, tap, double tap, and the like, are collectively referred to as a touch gesture.

The terminology used herein is for the purpose of describing particular embodiments of the present disclosure only and is not intended to be limiting of the inventive concept. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. In the drawings, the same reference numerals denote the same elements that substantially perform the same function.

FIG. 1 is a schematic diagram illustrating connection between a display apparatus 100 and a teacher User Equipment (UE) 200 according to an embodiment of the present disclosure.

Referring to FIG. 1, an educational application may be executed under a system environment including the teacher UE 200, the display apparatus 100 (e.g., an electronic bulletin board), and at least one student UE 300. The educational application under the system environment may include a packaged education solution program of hardware of the UEs 200 and 300 or the display apparatus 100, software, a service, and various educational applications.

The teacher UE 200, the display apparatus 100, and the student UE 300 may be wirelessly and directly connected using respective communication units. For example, the teacher UE 200, the display apparatus 100, and the student UE 300 may be connected through an ad-hoc mode or in an infra-structure mode for wireless connection through an Access Point (AP). In addition, the teacher UE 200, the display apparatus 100, and the student UE 300 may be connected through a connector by wire. A control unit of the teacher UE 200, a control unit of the display apparatus 100, and a control unit of the student UE 300 may share personal images or common images between each other using a communication unit. The common images may include, for example, a lecture materials, wring, drawing, object input, and the like, added to the lecture material, and the like.

The wireless communication may include, for example, a Wireless Local Area Network (LAN), Bluetooth (BT), Bluetooth low energy, Zigbee, Wi-Fi direct (WFD), Ultra WideBand (UWB), Infrared Data Association (IrDA), Near Field Communication (NFC), and the like, but is not limited thereto.

A control unit of the teacher UE 200, a control unit of the display apparatus 100, and a control unit of the student UE 300 may transmit requested personal images or common images through a communication unit. A management server (not shown) may be connectable to the teacher UE 200, the display apparatus 100, and the student UE 300 and may provide class management and study management.

The teacher UE 200, the display apparatus 100, and the at least one student UE 300 may transmit/receive device apparatus containing identification information, information supportable communication schemes, current state information, service information, and the like, between each other. It would be easily understood by those of ordinary skill in the art that the teacher UE 200, the display apparatus 100, and the student UE 300 transmits/receives the personal images, transmits/receives the common images, or transmits/receive the device information between each other.

The educational application may promptly approach various educational applications and web sites using a display apparatus (e.g., a smart TeleVision (TV) or an electronic bulletin board). The educational application may provide DataBases (DBs) about screen share between a teacher and a student, realtime share between study materials and schedule, easy progress of group study between students, realtime questions between a teacher and a student, a test, attendance/absence states, and test results.

It would be easily understood by those of ordinary skill in the art that the teacher UE 200, the display apparatus 100, and the at least one student UE 300 may be added, deleted, and changed according to the number of teachers and students in a class.

Figure 2:
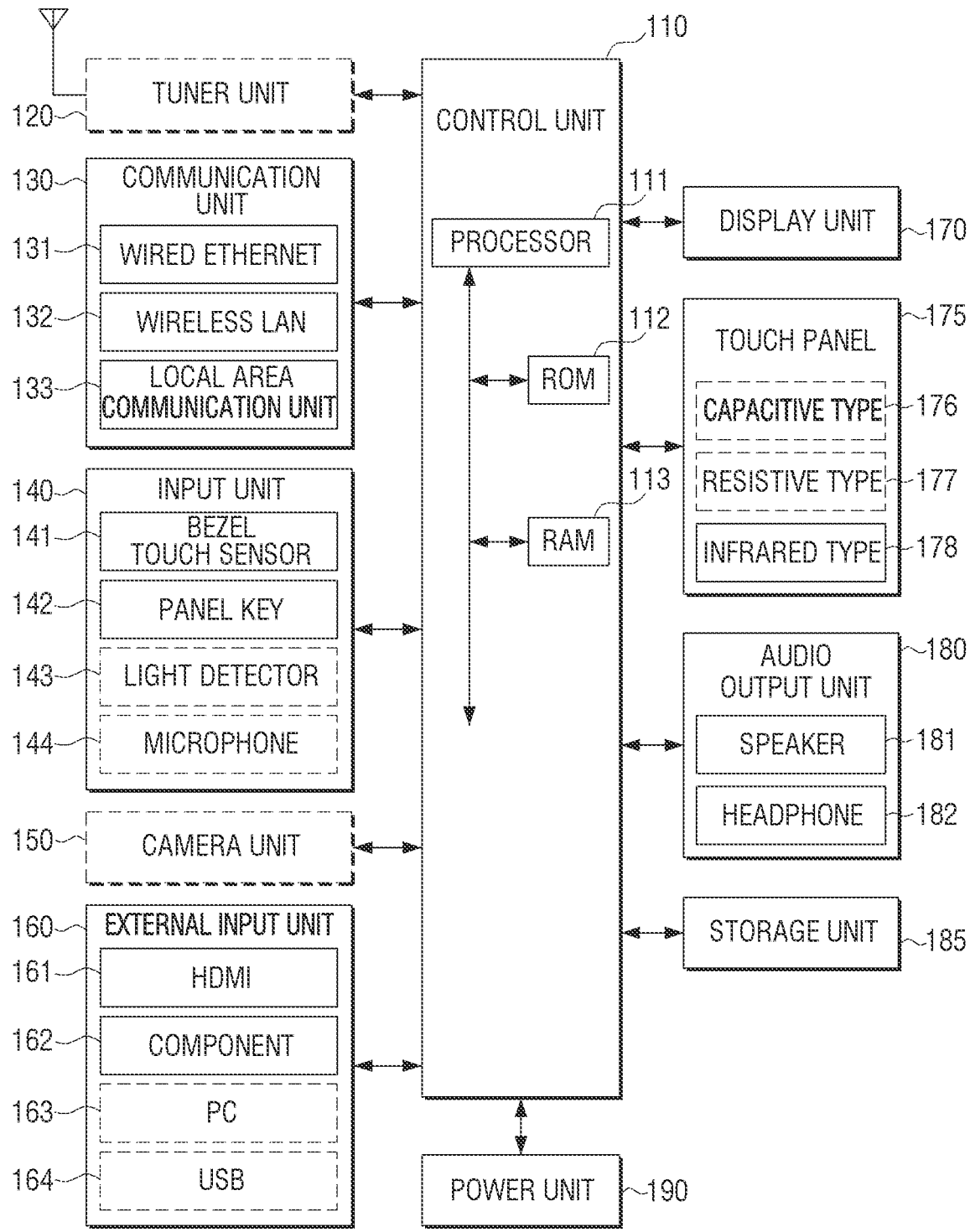
FIG. 2 is a schematic block diagram illustrating a display apparatus according to an embodiment of the present disclosure.

FIG. 2 is a schematic block diagram illustrating a display apparatus 100 according to an embodiment of the present disclosure.

Referring to FIG. 2, the display apparatus 100 may be connected by wire and/or wirelessly to an external apparatus (not shown) using a communication unit 130 and/or an external input unit 160. The external apparatus may include another display apparatus (not shown), a cellular phone (not shown), a smart phone (not shown), a tablet Personal Computer (PC) (not shown), and a server (not shown).

The display apparatus 100 may include one of a tuner unit 120, the communication unit 130, and the external input unit 160 as well as a display unit 170. In addition, the display apparatus 100 may include a combination of the tuner unit 120, the communication unit 130, and the external input unit 160 as well as the display unit 170. In addition, the display apparatus 100 including the display unit 170 may be electrically connected to an external apparatus (not shown) including a tuner unit. The display apparatus 100 may be embodied as, for example, an electronic bulletin board (an Interactive White Board (IWB)), a Large Format Display (LFD), an analog TV, a digital TV, a Three-Dimensional (3D) TV, a smart TV, a Light Emitting Diode (LED) TV, an Organic Light Emitting Diode (OLED) TV, a plasma TV, a monitor, or the like. However, it would be easily understood by those of ordinary skill in the art that the present disclosure is not limited thereto.

Among the components (110 to 190) illustrated in FIG. 2, components (e.g., a tuner unit) denoted by broken lines may be selectively installed in the display apparatus 100. The display apparatus 100 may not include the component denoted by broken lines according to selection of a manufacturer or user.

The display apparatus 100 includes the tuner unit 120, the communication unit 130, an input unit 140, a camera unit 150, the external input unit 160, the display unit 170, a touch panel 175, an audio output unit 180, a storage unit 185, and a power unit 190. In addition, the display apparatus 100 may include a sensor (e.g., an illumination sensor, a temperature sensor, and the like (not shown)) for detection of an internal or external state of the display apparatus 100.

A control unit 110 may include a processor 111, a Read Only Memory (ROM) 112 that stores a control program for control of the display apparatus 100, and a Random Access Memory (RAM) 113 that stores a signal or data input from an external unit of the display apparatus 100 and is used as a storage region corresponding to various operations performed by the display apparatus 100.

The control unit 110 controls an overall operation of the display apparatus 100 and signal flow between inner components 120 to 190 of the display apparatus 100 and processes data. The control unit 110 controls power supplied to the internal components 120, 130, 140, 150, 160, 170, 175, 180, 185 and 190 from the power unit 190. In addition, when a user input is present or a predetermined and stored condition is satisfied, the control unit 110 may execute an OS and various applications stored in the storage unit 185.

The processor 111 may include a graphic processor (not shown) for graphically processing an image. The processor 111 may be embodied in the form of System on Chip (SoC) including a core (not shown) and a Graphic Processor Unit (GPU). The processor 111 may include a single core, a dual core, a triple core, a quad core, and a core of a multiple thereof. In addition, the control unit 110 may include a GPU (not shown) including a graphic processor (not shown) formed on a separate circuit board that is electrically connected to the control unit 110, and a graphic RAM (not shown) or a graphic ROM (not shown).

The processor 111 may be embodied as a plurality of processors including a main processor (not shown) and a sub processor (not shown). The sub processor refers to a processor that operates in a sleep mode. In addition, the processor 111, a ROM 112, and a RAM 113 may be connected to each other through an internal bus.

According to an embodiment of the present disclosure, the term "control unit" may indicate a component including the processor 111, the ROM 112, and the RAM 113.

A control unit 110 according to an embodiment of the present disclosure may control a display apparatus to display a first content image on a display apparatus, to display a folding area at a first edge portion of the first content image in response to a location of first touch detected at a bezel of the display apparatus, and to move the first content image from an adjacent folding area of the first content image to the folding area in response to holding time of the first touch.

In some embodiments of the present disclosure, the control unit 110 may display various types of content images.

For example, when the first content image is completely moved, the control unit 110 may display a second content image as a portion of the first content image.

The control unit 110 may display the second content image to contain a second edge portion of the first content image, which is positioned to be opposite to a direction in which the first content image is moved.

The control unit 110 may change an area of the second content image in response to second touch detected at the bezel.

The control unit 110 may display a folding line for differentiating the folding area and the adjacent folding area of the first content image.

The control unit 110 may change an area of the folding area according to user input.

The control unit 110 may display the folding area at one of four edge portions of the first content image in response to the first touch.

The control unit 110 may move the displayed first content image by winding the first content image like a roll around the folding area or removing the first content image to the folding area from the adjacent folding area of the first content image.

The control unit 110 may display the display apparatus to change a third content image display on the folding area in response to movement of the first content image.

The control unit 110 may control a moving speed of the first content image to be constant or non-constant in response to holding time of the first touch.

Upon detection of a touch gesture from the second content image, the control unit 110 may control the display apparatus to restore the second content image to the first content image.

Upon receiving writing on the whiteboard of a user from the second content image and detecting the touch gesture from the second content image, the control may control the display apparatus to display the writing on the whiteboard together with the first content image.

The control unit 110 may control the display apparatus to provide at least one of visual feedback and audible feedback in response to movement of the first content image.

The control unit 110 may display the first content image on the display apparatus and to display the folding area at an edge portion of the first content image in response to a location of the first touch detected from a bezel. In addition, the control unit 110 may move the first content image to the folding area from the adjacent folding area, which contacts the folding area, in response to continuous movement of the first touch, and display the second content image when the first content image is completely moved.

It would be easily understood by those of ordinary skill in the art that components and operation of the control unit 110 may be embodied in various ways in some embodiments of the present disclosure.

The tuner unit 120 may tune and select only a frequency of a channel to be received by the display apparatus 100 among many radio waves by performing amplification or mixing, or causing resonance on a broadcast signal received by wire or wirelessly. The broadcast signal may include video data, audio data, and additional data (e.g., Electronic Program Guide (EPG)).

The tuner unit 120 may receive the video data, the audio data, and the additional data in a frequency band corresponding to a channel number (e.g., cable broadcast #14) in response to user input. For example, the user input may be performed in various manners such as channel number input, channel up-down input, and channel input on an EPG image via a remote control apparatus 200, channel up-down input via a panel key 142 and the like.

The tuner unit 120 may receive broadcast signals from various sources such as terrestrial broadcast, cable broadcast, satellite broadcast, Internet broadcast, and the like. The tuner unit 120 may receive the broadcast signals from sources such as analog broadcast or digital broadcast.

The tuner unit 120 may be embodied in all-in-one type with the display apparatus 100. The tuner unit 120 may be electrically connected to the display apparatus 100 and may be embodied as a separate device (not shown) (e.g., set-top box) including a tuner unit. In addition, the tuner unit 120 may be embodied as a tuner unit (not shown) connected to the external input unit 160.

The communication unit 130 may connect the display apparatus 100 to an external apparatus (e.g., a server) according to control of a control unit 110. The control unit 110 may download and perform web browsing an application from the external apparatus connected via the communication unit 130. The communication unit 130 may include one of a wired Ethernet 131, a wireless LAN 132, and a local area communication unit 133 according to the performance and structure of the display apparatus 100. In addition, the communication unit 130 may include a combination of the wired Ethernet 131, the wireless LAN 132, and the local area communication unit 133. The wireless LAN 132 may be wirelessly connected to an AP (not shown) at a position in which the AP is installed, according to control of a control unit 110. The wireless LAN 132 supports wireless LAN standard (IEEE802.11x) of Institute of Electrical and Electronics Engineers (IEEE). With regard to the local area communication unit 133, local area communication may include Bluetooth, Bluetooth low energy, IrDA, Wi-Fi, UWB, NFC, and the like.

The input unit 140 receives user input (e.g., user input using a bezel touch sensor positioned on a bezel, user input using a panel key, user input via a light detector, user input via a microphone, and the like). The user input received through the input unit 140 may be converted and output to the control unit 110 according to control of the control unit 110.

A bezel touch sensor 141 may receive user input that contacts a front surface 10*b* (refer to FIGS. 3A to 3C) of a bezel 10 (refer to FIGS. 3A to 3C) of the display apparatus 100. In addition, the bezel touch sensor 141 may receive user input that contacts a bezel side surface 10*c* (between the bezel front surface 10*b* and a bezel rear surface 10*d*) of the display apparatus 100.

The user input according to an embodiment of the present disclosure may include touch via a finger including a thumb or touch via an input unit (not shown) including a stylus. Contact according to an embodiment of the present disclosure may include bezel hovering as well as bezel touch. It would be easily understood by those of ordinary skill in the art that the bezel touch sensor 141 may receive bezel hovering as well as bezel touch. The bezel touch sensor 141 will be described in detail with reference to FIGS. 3A to 3C.

The panel key 142 is positioned at one side of a rear cover 100b of the display apparatus 100. The panel key 142 receives direct input of a user. The panel key 142 may include a power key (not shown), a sound key (not shown) and a channel key (not shown). The panel key 142 may include a menu key (not shown). The panel key 142 may convert the received user input (e.g., input via a power unit) and output the user input to a control unit 110. In addition, the panel key 142 may be positioned at one side of a side surface (e.g., the bezel side surface 10c) of the display apparatus 100.

A light detector 143 receives an optical signal received from an external remote controller (not shown) through a light window (not shown) of the bezel front surface 10b. For example, the light detector 143 may receive an optical signal (e.g., a control signal for powering on the display apparatus 100) corresponding to a key (e.g., push or touch of a power key) included in the remote controller.

A microphone 144 receives user utterance voice. The microphone 144 may convert the received voice and output the voice to a control unit 110. The user voice may include, for example, voice corresponding to a menu and/or function of the display apparatus 100. A recognition range of the microphone 144 may be recommended as a range to 4 m from the microphone 144 and a recognition of the microphone 144 may vary in response to the amount of user voice and surrounding environment (e.g., surrounding noise).

The microphone 140 may be integrally formed with the display apparatus 100 or may be separately formed from the display apparatus 100. The separated microphone 144 may be electrically connected through the communication unit 130 and/or the external input unit 160.

The camera unit 150 receives an image (e.g., consecutive frames) corresponding to user motion including a gesture within a camera recognition range. The camera recognition range may be, for example, 0.2 to 5 m to a user from the camera unit 150. The user motion may include, for example, a user body part such as a user face, face expression, a hand, a fist, and a finger or motion of the user body part. The camera unit 150 may convert a received image into an electrical signal and output the electrical signal to a control unit 110.

The camera unit 150 may include a lens (not shown) and an image sensor (not shown). The camera unit 150 may support optical zoom (e.g., five-time optical zoom) using a plurality of lenses and image processing or digital zoom (e.g., 20-time digital zoom). A recognition range of the camera unit 150 may variously set according to an angle between a camera and a user and a surrounding environment condition.

When the camera unit 150 includes a plurality of cameras, the camera unit 150 may receive a 3D still image or a 3D motion using a first camera (not shown) at an upper end of a bezel and a second camera (not shown) (e.g., an interval with the first camera is more than 2 cm and less than 8 cm) adjacent thereto.

The camera unit 150 may be integrally formed with the display apparatus 100 or may be separately formed from the display apparatus 100. A device (not shown) including the separated camera unit 150 may be electrically connected to the display apparatus 100 through the communication unit 130 or the external input unit 160.

The external input unit 160 receives an image (e.g., a moving picture), audio (e.g., voice, music, and the like), corresponding data, and the like, from outside the display apparatus 100 according to control of a control unit 110. The external input unit 160 may include one of a High-Definition Multimedia Interface (HDMI) input port 161, a component input jack 162, a PC input port 163, and a Universal Serial Bus (USB) input jack 164. The external input unit 160 may include a combination of the HDMI input port 161, the component input jack 162, the PC input port 163, and the USB input jack 164.

The display unit 170 may display an image including a broadcast signal received through the tuner unit 120 according to control of the control unit 110. The display unit 170 may display an image input through the communication unit 130 and/or the external input unit 160. The display unit 170 may output an image pre-stored in the storage unit 185 according to control of the control unit 110. The display unit 170 may display an image of educational application and educational application according to control of the control unit 110. The display unit 170 may display a common image received from a teacher UE and/or a student UE.

The display unit 170 according to an embodiment of the present disclosure may output visual feedback corresponding to a first content image, a second content image, a third content image, a fourth content image, a folding area, a folding line, or a movement of a content image according to control of the control unit 110.

The touch panel 175 may receive user input. The touch panel 175 may receive single touch or multi touch via a user body (e.g., a finger including a thumb) or an input unit. The touch panel 175 may transmit an analog signal corresponding to the signal or multi touch to a touch panel controller (not shown). The touch panel 175 may be embodied as, but is not limited to, a capacitive type 176, a resistive type 177, an infrared type 178, or an acoustic type (not shown). The touch panel controller may convert the received analog signal into a digital signal (e.g., X and Y coordinates corresponding to touch) and transmit the digital signal to the control unit 110.

The control unit 110 may control the display unit 170 using the digital signal received from the touch panel controller. For example, the control unit 110 may display selection of a shortcut icon (not shown) displayed on the display unit 170 in response to input touch or an image of an application executed in response to the selected shortcut icon. In addition, the control unit 110 may calculate X and Y coordinates using the digital signal received from the touch panel controller.

The touch panel controller may be included in the control unit 110 according to the performance or structure of the display apparatus 100.

The audio output unit 180 outputs audio included in the broadcast signal received through the tuner unit 120 according to control of the control unit 110. The audio output unit 180 may output the audio (e.g., voice and sound) input through the communication unit 130 or the external input unit 160 or audio included in an image. In addition, the audio output unit 180 may output audio pre-stored in the storage unit 185 according to control of the control unit 110. The audio output unit 180 may include one of a speaker 181 and a headphone output terminal 182. The audio output unit 180 may include both the speaker 181 and the headphone output terminal 182.

The audio output unit 180 according to an embodiment of the present disclosure may output audible feedback corresponding to content movement according to control of the control unit 110.

The storage unit 185 may store various data, programs, or applications for driving and controlling the display apparatus 100 according to control of the control unit 110. The storage unit 185 may store input/output signal or data corresponding to driving of the tuner unit 120, the communication unit 130, the input unit 140, the camera unit 150, the external input unit 160, the display unit 170, the touch panel 175, the audio output unit 180, and the power unit 190. The storage unit 185 may store a control program for control of the display apparatus 100 and the control unit 110, an application that is initially provided by a manufacturer or downloaded from an external source, a Graphical User Interface (GUI) associated with the application, an object (e.g., an image, a text, an icon, a button, and the like) for providing the GUI, user information, a document, databases, or associated data.

According to various embodiments of the present disclosure, the term "storage unit" may include the storage unit 185, the ROM 112 or RAM 113 of the control unit 110, or a memory card (not shown) (e.g., a micro Secure Digital (SD) card or a USB memory). In addition, the storage unit 185 may include a non-volatile memory, a volatile memory, a Hard Disk Drive (HDD), or a Solid State Drive (SSD).

The storage unit 185 may include a tuner module, a communication module, a bezel touch sensor module, a panel key module, a light receiving module, a microphone module, a camera module, an external input module, a display module, a touch panel module, an audio output module, a storage module, a power module, or an associated DB, which is not shown. In addition, the storage unit 185 may further include a volume control module that is not shown.

The non-shown modules and database of the storage unit 185 may be embodied in the form of software in order to perform a tuner control function, a communication control function, a bezel touch sensor control function, a panel key control function, a light receiving control function, a microphone control function, a camera control function, an external input control function, a display control function, a touch panel control function, an audio output control function, a storage control function, a power control function, or an associated DB control function by the display apparatus 100. In addition, the non-shown modules and database of the storage unit 185 may be embodied in the form of software in order to perform a volume control function by the display apparatus 100. The control unit 110 may control the display apparatus using the modules and software stored in the storage unit 185.

The storage unit 185 may store data corresponding to structures of various images. In detail, the storage unit 185 may store data corresponding to sizes, areas, or locations corresponding to a first content image 500, a second content image 501, a third content image 502, a fourth content image 503, a transition content image 504, and a blank space 500b.

The storage unit 185 may store first touch location information corresponding to first touch detected from the bezel 10 of the display apparatus 100 and second touch location information corresponding to detected second touch according to control of the control unit 110.

The storage unit 185 may store a holding time of the first touch and a holding time of the second touch. The storage unit 185 may store information corresponding to a continuous movement of the first touch and information corresponding to a continuous movement of the second touch. In addition, the storage unit 185 may store touch tap detected from the bezel 10, touch tap location information and touch location information corresponding to touch detected from an IrDA touch panel, information corresponding to continuous movement of touch, and double tap location information corresponding to a double tap.

The storage unit 185 may store first hovering location information corresponding to first hovering detected from the bezel 10 of the display apparatus 100 and second hovering location information corresponding to detected second hovering according to control of the control unit 110.

The storage unit 185 may store the size, area, or location corresponding to a folding area 520. In addition, the storage unit 185 may store a location corresponding to a folding line 520a, a type (e.g., a solid line or a broken line) of the folding line 520a, the thickness of the folding line 520a, and the like.

The storage unit 185 may store a folding area effect (e.g., a gradation effect, and the like) for differentiation from the first content image. The storage unit 185 may store a predetermined distance corresponding a spaced distance between the folding area 520 and the bezel 10. In addition, the storage unit 185 may store a predetermined distance of an adjacent folding area 500a.

The storage unit 185 may store information about whether a third content image displayed on the folding area 520 is changed in response to movement of the first content image.

The storage unit 185 may store a predetermine length of the second blank space 500b.

The storage unit 185 may store a predetermined moving speed of the first content image 500. In addition, the storage unit 185 may store a variable moving speed of the first content image 500.

The storage unit 185 may store a minimum area of the second content image 501.

The storage unit 185 may store a type of feedback provided in response to movement and/or display of content images. In addition, the storage unit 185 may store an image or sound corresponding to each feedback.

The storage unit may 185 store a moving speed of the transition content image 504.

The power unit 190 supplies power input from an external power source to the components 120 to 185 included in the display apparatus 100 according to control of the control unit 110. In addition, the power unit 190 may supply power to one or two or more batteries (not shown) positioned in the display apparatus 100 according to control of the control unit 110. The battery providing power may be positioned between the display unit 170 and the rear cover 100b.

At least one of the components (e.g., 110 to 190) of the display apparatus 100 of FIGS. 1 and 2 may be added or deleted in response to the performance of the display apparatus 100. In addition, it would be easily understood by those of ordinary skill in the art that locations of the components (e.g., 110 to 190) may be changed in response to the performance or structure of the display apparatus 100.

Figure 3A:
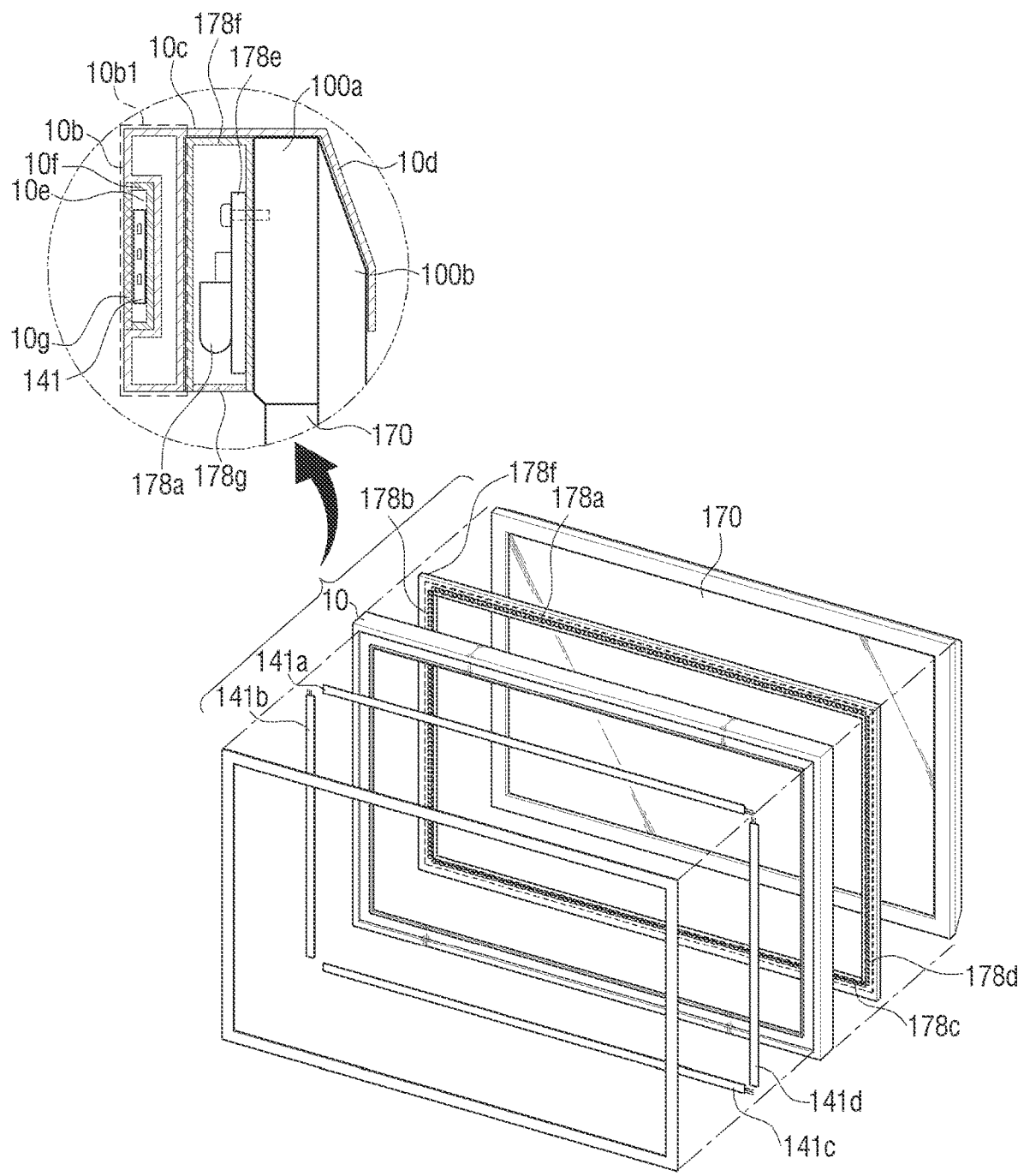
FIGS. 3A, 3B, and 3C are schematic diagrams illustrating a bezel of a display apparatus according to various embodiments of the present disclosure.
Figure 3B:
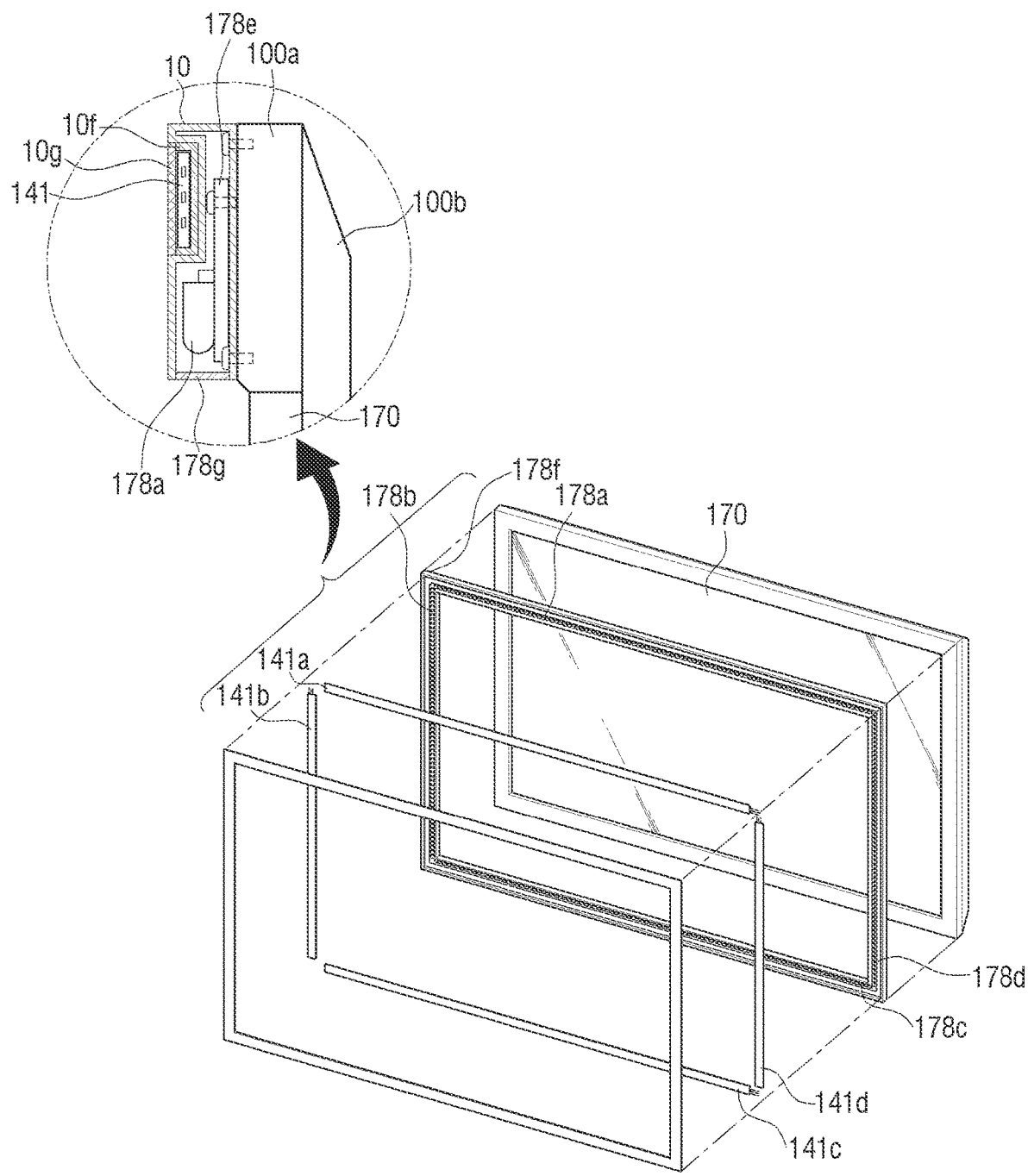
Figure 3C:
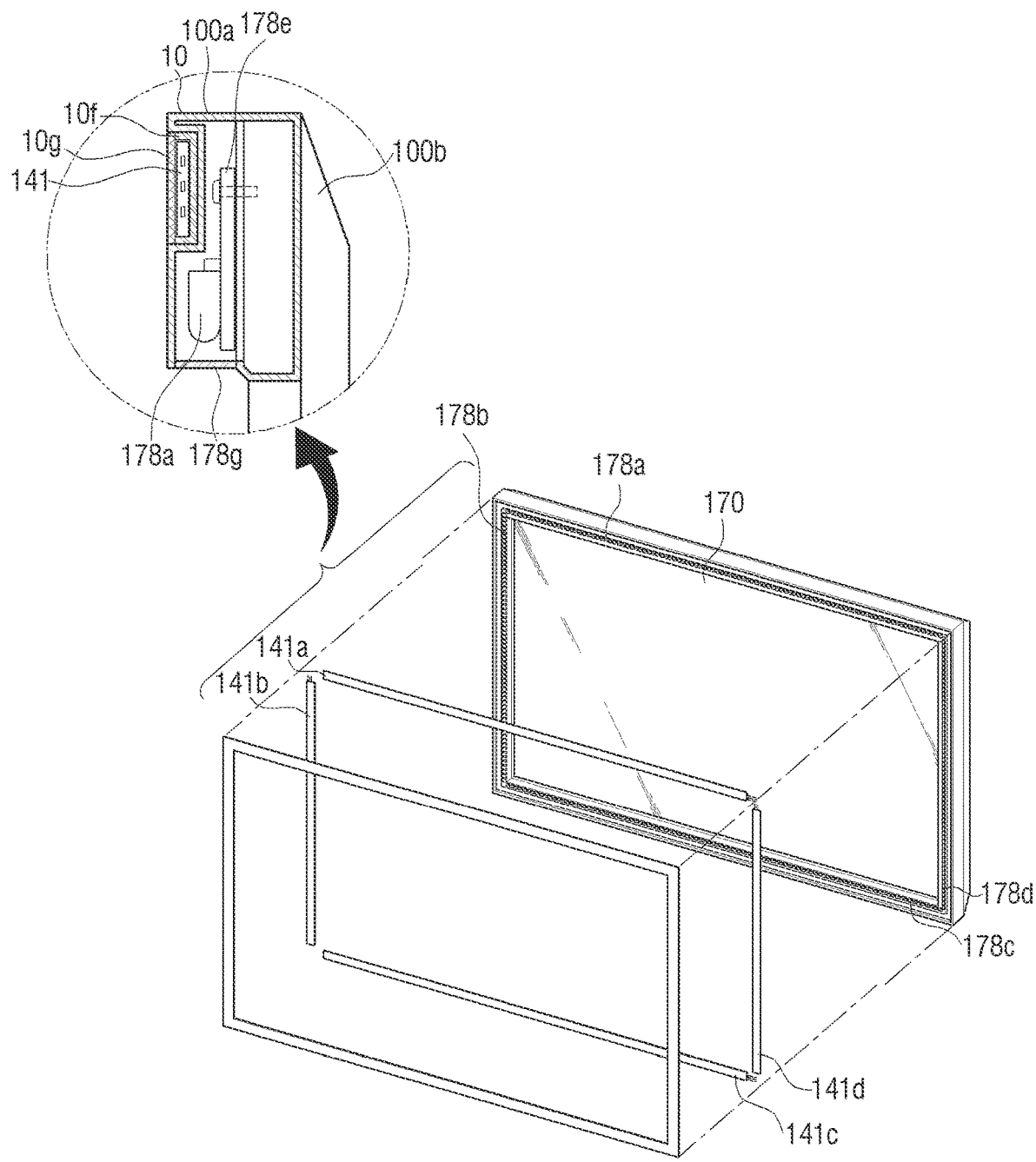

FIGS. 3A, 3B, and 3C are schematic diagrams illustrating a bezel of a display apparatus according to an embodiment of the present disclosure.

Referring to FIG. 3A, the bezel 10 that surrounds and supports the display unit 170 which contacts a plurality of light emitter arrays 178a and 178b, and a light emitter/detector frame 178f including light detector arrays 178c and 178d facing the light emitter arrays 178a and 178b.

The light emitter/detector frame 178f contacts a front cover 100a. The light emitter/detector frame 178f and the front cover 100a may be adhered to each other via an adhesive tape, an adhesive agent, or a separate coupling member (not shown) (e.g., a screw, and the like). A Printed Circuit Board (PCB) 178e that is electrically connected to the plural light emitter arrays 178a and 178b, the plural light detector arrays 178c and 178d, and the plural light emitter/detector arrays 178a to 178d may be inserted into the light emitter/detector frame 178f. The PCB 178e may include a touch panel controller. The PCB 178e may be electrically connected to the control unit 110. The PCB 178e may be electrically connected to the power unit.

Light beams output from the plural light emitter arrays 178a and 178b corresponding to X and Y axes may be received by the plural light detector arrays 178c and 178d to form a light matrix. When light is blocked according to user touch, the touch panel controller may output a digital signal corresponding to the blocked location (e.g., X and Y coordinates) to the control unit 110. The control unit 110 may calculate X and Y coordinates corresponding to the blocked location using the received digital signal.

The light emitter/detector frame 178f may include a light window 178g. The light window 178g may be positioned in front of each of the light emitter arrays 178a and 178b and the light detector arrays 178c and 178d. The light beam output from the plural light emitter arrays 178a and 178b may be transmitted through the light window 178g, and the plural light detector arrays 178c and 178d may receive the light beam transmitted through the light window 178g. A material for formation of the light window 178g may include optical glass (e.g., crown glass, flint glass, barium crown glass), and plastic (e.g., poly-methyl-meta-acrylate, polycarbonate, aryl-dicrylium-carbonate).

The light emitter/detector frame 178f may include an opening that guides an optical signal transmitted through a light window (not shown) to the light detector 143.

The light emitter/detector frame 178f and a bezel front surface 10b1 may be adhered to each other via an adhesive tape, an adhesive agent, or a separate coupling member (e.g., a screw, and the like).

The bezel 10 may be formed of light metallic material (e.g., aluminum, and the like), high-intensity/high-elasticity reinforced plastic, or high-intensity/high-elasticity carbon fiber.

The bezel touch sensor 141 is positioned in a groove 10e formed on the bezel front surface 10b. Grooves 10e are positioned at four edge portions of the bezel front surface 10b. The groove 10e may be connected to each other. In addition, grooves (not shown) may be positioned on the bezel side surface 10c. The grooves of the bezel side surface 10c may be connected to each other.

A plurality of bezel touch sensors (e.g., at least eight bezel touch sensors) corresponding to a plurality of grooves (not shown) may be positioned in the plural grooves formed on the bezel front surface 10b. Respective bezel touch sensors 141 positioned in the plural grooves 10e of the bezel front surface 10b may detect Two-Dimensional (2D) movement (e.g., diagonal movement of touch) as well as one-dimensional movement (e.g., vertical or horizontal movement of touch) of a conventional bezel touch sensor.

The bezel touch sensors 141 are positioned in the grooves 10e of the bezel front surface 10b. The bezel touch sensors 141 may be fixed to the grooves 10e using an adhesive tape or adhesive. In addition, the bezel touch sensors 141 may be positioned on insulating layers 10f (e.g., insulating tapes) in the groove 10e of the bezel front surface 10b according to a bezel material. In addition, a protective layer 10g (e.g., a film, a plastic layer, or a glass layer) may be positioned on the bezel touch sensors 141. The protective layer 10g may protect the bezel touch sensor 141 from external strong shocks and/or damage. In addition, the protective layer 10g may have the same color as the bezel front surface 10b.

The bezel touch sensor 141 includes a potentiometer with a small thickness. The bezel touch sensor 141 may have resistance that linearly changes in response to received touch so as to precisely measure a location. In addition, the bezel touch sensor 141 may have resistance that linearly changes in response to continuous movement of the received touch so as to precisely measure a location. One or more bezel touch sensors 141 may be used to correspond to a horizontal length and vertical length of the bezel 10. For example, when the entire horizontal length of the bezel touch sensor 141 is 1200 mm, the bezel touch sensor 141 may use two bezel touch sensors with a length of 500 mm and one bezel touch sensor with a length of 200 mm that are electrically connected to each other. When the entire vertical length of the bezel touch sensor 141 is 600 mm, the bezel touch sensor 141 may use one bezel touch sensor with a length of 500 mm and one bezel touch sensor with a length of 100 mm that are electrically connected to each other.

Touch input to the bezel touch sensor 141 may be generated by a user body or an input unit.

The bezel front surface 10b may include a light window (not shown). An optical signal transmitted through the light window may reach the light detector 143 in the display apparatus 100. A material for formation of the light window may include optical glass (e.g., crown glass, flint glass, barium crown glass), and plastic (e.g., poly-methyl-meta-acrylate, polycarbonate, aryl-dicrylium-carbonate).

The bezel 10 may also include an upper bezel touch sensor 141a, a left bezel touch sensor 141b, a lower bezel touch sensor 141c and a right bezel touch sensor 141d.

Referring to FIG. 3B, the light emitter/detector frame 178f and the bezel 10 may be integrally formed. The bezel 10 may include the light emitter arrays 178a and 178b/the light detector arrays 178c and 178d, the PCB 178e, and the light window 178g. In addition, the bezel 10 may include the groove 10e, the insulating layer 10f, the bezel touch sensor 141, and the protective layer 10g. In the bezel 10, the light emitter arrays 178a and 178b/the light detector arrays 178c and 178d, the PCB 178e, and the light window 178g may be differentiated from the insulating layer 10f, the bezel touch sensor 141, and the protective layer 10g by the groove 10e.

The bezel 10 may be coupled to the front cover 100a via a coupling member (e.g., a screw, and the like). The bezel 10 may be coupled to the front cover 100a via an adhesive tape or adhesive. The bezel 10 and the rear cover 100b may also be coupled.

The thickness of the integration type bezel 10 of FIG. 3B may be smaller than the thickness of the bezel 10 of FIG. 3A. The thickness of a bezel of FIG. 3A including the bezel front surface 10b1 and the light emitter/detector frame 178f is greater than the thickness of an integration type bezel of FIG. 3B. When the groove 10e of the integration type bezel 10 is positioned in an outer region (e.g., a region in which the light emitter arrays 178a and 178b and the light detector arrays 178c and 178d that face each other are not present), the thickness of the bezel 10 may be smaller than the bezel of FIG. 3A. In addition, when the groove 10e of the integration type bezel 10 is positioned in the outer region (e.g., the region in which the light emitter arrays 178a and 178b and the light detector arrays 178c and 178d that face each other are not present), the width of the bezel 10 may be reduced, but the thickness thereof may be increased.

The thickness and width of the bezel may be changed to correspond to positions of the grooves 10e on the light emitter arrays 178a and 178b and the light detector arrays 178c and 178d of the light emitter/detector frame 178f.

Components of FIG. 3B are substantially the same as those of FIG. 3A, and thus, a detailed description thereof will be omitted.

Referring to FIG. 3C, the bezel 10 may be integrated with the front cover 100a unlike in FIGS. 3A and 3B. In FIG. 3C, the bezel 10 includes the front cover 100a.

The bezel 10 may include the light emitter arrays 178a and 178b/the light detector arrays 178c and 178d, the PCB 178e, the light window 178g, the groove 10e, the insulating layer 10f, the bezel touch sensor 141, and the protective layer 10g. The bezel 10 and the rear cover 100b may be coupled via a coupling member (e.g., a screw, and the like). In addition, the front cover 100a may be coupled to the rear cover 100b via an adhesive tape or adhesive.

Components of FIG. 3C are substantially the same as those of FIG. 3A or 3B, and thus, a detailed description thereof will be omitted.

When the touch panel 175 of the display apparatus 100 is the capacitive type touch panel 176 or the resistive type touch panel 177, the light emitter/detector frame 178f may not be present in a bezel. It is sufficient that the bezel 10 includes only the groove 10e, the insulating layer 10f, the bezel touch sensor 141, and the protective layer 10g. A structure of this case is similar to the structure of FIG. 3C with some exceptions.

When the touch panel 175 of the display apparatus 100 is the capacitive type touch panel 176 or the resistive type touch panel 177, a bezel may have a smaller thickness than the bezel without the light emitter/detector frame 178f of FIGS. 3A to 3C.

FIG. 4 is a schematic flowchart of a method of displaying an image by a display apparatus according to an embodiment of the present disclosure.

FIGS. 5A, 5B, 5C, 5D, 5E, 5F, 5G, 5H, SI, 6, 7, and 8 illustrate examples of an image of a display apparatus according to an embodiment of the present disclosure.

Referring to FIG. 4, a first content image is displayed in operation 401.

Figure 5A:
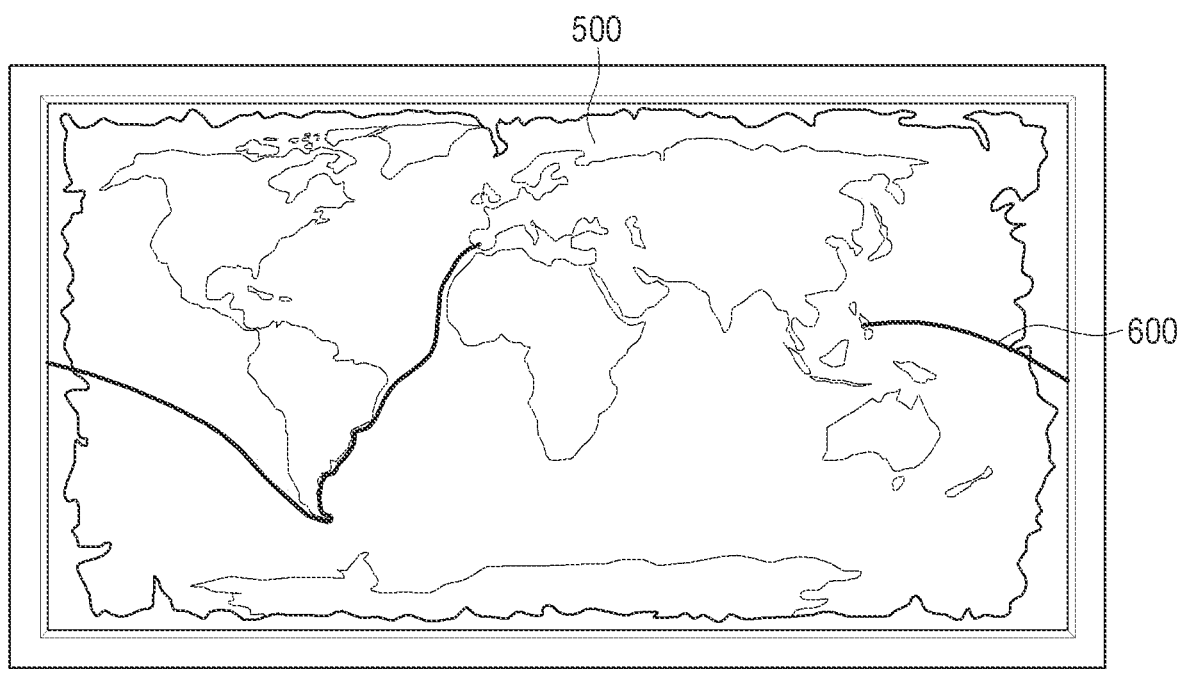
FIGS. 5A, 5B, 5C, 5D, 5E, 5F, 5G, 5H, 5I, 6, 7, and 8 illustrate examples of an image of a display apparatus according to various embodiments of the present disclosure.

Referring to FIG. 5A, the first content image 500 is displayed on the display unit 170 of the display apparatus 100. When an educational application is executed, a content image of the educational application may be displayed. Displayable content may be a textbook, test paper, or homework. In addition, when a web browser is executed, the content image may be a web page. The first content image 500 illustrated in FIG. 5A indicates a world map. A teacher may teach a class using the first content image 500. For example, when the teacher teaches a class about Magellan, he or she may add a partial path 600 of a navigation path of Magellan to the displayed world map using a finger including a thumb or an input unit.

When the partial path 600 of the navigation path of Magellan is input to the infrared type touch panel 178, a control unit 110 may display and overlay a line corresponding to continuous positions of detected touch on the world map. The partial path 600 may be a separate layer from a layer corresponding to the first content image 500. The control unit 110 may add, remove, and move the partial path 600 as a separate layer according user input. Change in the separate layer may not affect a layer of the first content image 500.

A reference coordinate of the partial path 600 is an upper left apex of the first content image. A coordinate of coordinate of the upper left apex may be (0, 0). Each position of the added partial path 600 may be expressed as a relative coordinate based on the upper left apex. Movement of the first content image 500 may refer to movement of the upper left apex.

In response to the movement of the reference coordinate, addable objects (e.g., writing on the whiteboard, an image, a text, a moving picture, or the like) to the first content image 500 may also be displayed on the same position as the first content image 500.

The first content image 500 may be displayed with a size of an entire screen of the display unit 170. In addition, the first content image 500 may include a first blank space at each edge.

In operation S402 of FIG. 4, first touch is detected from a bezel.

Figure 5B:
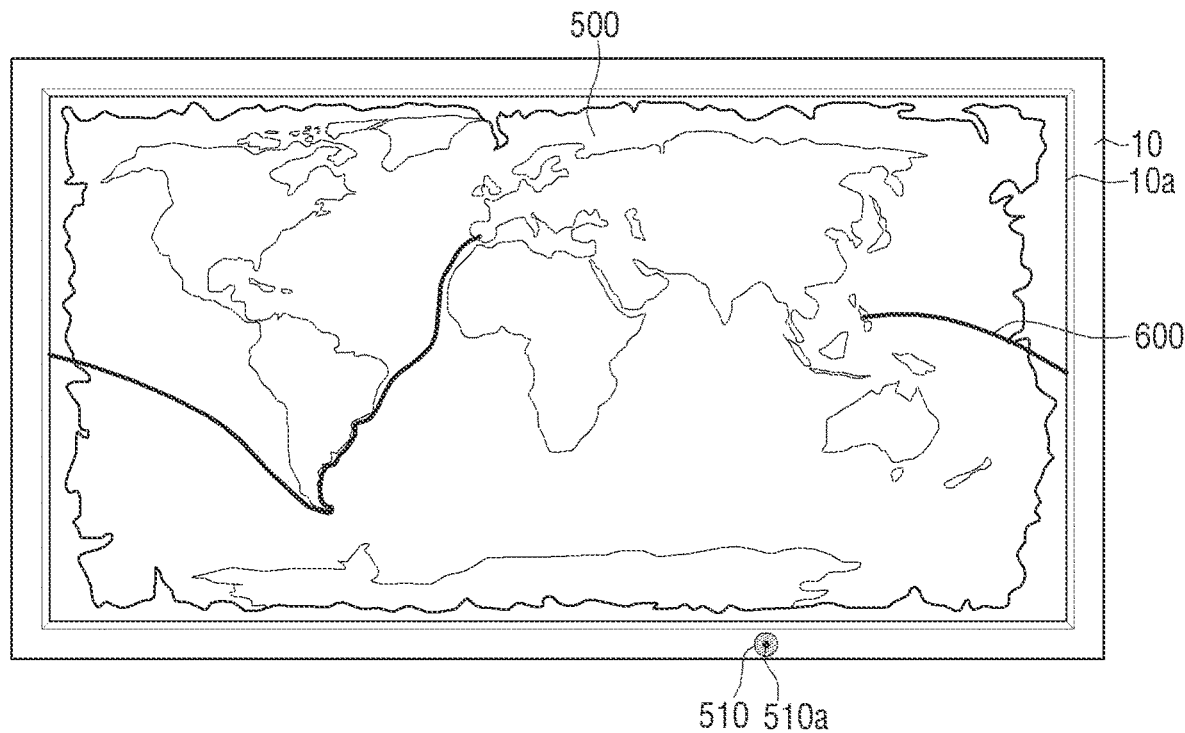

Referring to FIG. 5B, a user puts the first touch on the bezel 10 of the display apparatus 100 in which the first content image 500 is displayed. The control unit 110 may detect first touch 510 using the bezel touch sensor 141 and a touch controller (not shown). The control unit 110 may receive first touch location information (for example, X1 and Y1 coordinates) of a first touch location 510a corresponding to the first touch 510 from the touch sensor controller. The control unit 110 may store the first touch location information corresponding to the first touch location 510a in a storage unit 185. The stored first touch location information may further include IDentification (ID) for history management, a touch location, touch detection time, and a detection voltage (or current). The first touch 510 may be generated by one of fingers including a thumb and/or a touchable input unit. According to an embodiment of the present disclosure, the user may include a teacher, a student, or a person who uses the display apparatus 100.

The control unit 110 may detect first hovering (not shown) using the bezel touch sensor 141 and the touch sensor controller. The control unit 110 may receive first hovering location information of a first hovering location (not shown) corresponding to the first hovering from the touch sensor controller.

The control unit 110 may store the first hovering location information corresponding to the first hovering location in the storage unit 185. The stored first hovering location information may contain a hovering location, hovering detection time, or a detection voltage (or current). The first hovering may be generated by one of fingers including a thumb or a touchable input unit.

In operation S403 of FIG. 4, a folding area is displayed at an edge portion of the first content image.

Figure 5C:
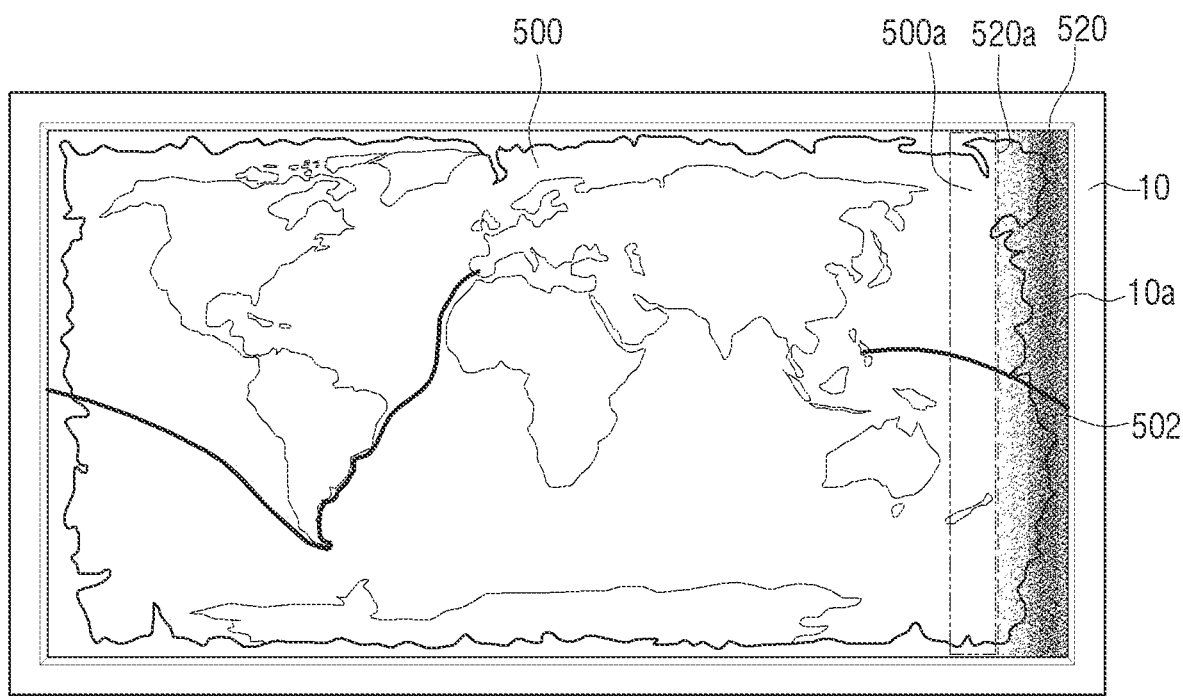

Referring to FIG. 5C, when the first touch 510 is detected, the control unit 110 displays the folding area 520 at a first edge of the first content image 500. The edge of the first content image 500 may contact an edge 10a of the bezel 10. The edge 10a of the bezel 10 may contact the display unit 170 in order to support the display unit 170. The edge of the first content image 500 may include an upper edge, a lower edge, a left edge, or a right edge of the first content image 500.

An area of the folding area 520 may be changed to correspond to an area of the display unit 170. As an area of the display unit 170 is increased, the area of the folding area 520 may be increased. According to an embodiment of the present disclosure, the area of the folding area 520 may be $\frac{1}{15}$ of the area of the display unit 170. It would be easily understood by those of ordinary skill in the art that the area of the folding area 520 is changed by a manufacturer or a user.

The folding area 520 may be convexly (or concavely) displayed like a roll shaft around which a roll is woundable. The folding area 520 may overlap the first content image 500 and may be displayed as a separate area. The folding area 520 may be differentially displayed from the first content image 500 (e.g., according to gradation effect).

The folding area 520 may be displayed to be spaced apart from each bezel 10 by as much as a predetermined distance (e.g., 2 mm, changeable). The folding area 520 may include a folding line 520a. The folding area 520 may be differentiated from the first content image 500 by the folding line 520a.

The adjacent folding area 500a of the first content image may refer to an imaginary area spaced apart from the folding line 520a in an opposite direction to the folding area 520 by a predetermined distance (e.g., 50 mm, changeable). The folding line 520a may be displayed between the folding area 520 and the adjacent folding area 500a of the first content image.

The folding area 520 may display the third content image 502. The folding area 520 may be displayed using a portion of the edge of the first content image 500. In this case, the third content image 502 displayed on the folding area 520 may be a portion of the edge of the first content image 500. An area of the third content image 502 is smaller than the first content image 500. The third content image 502 may be convexly displayed to correspond to the folding area 520 that is convexly displayed. In addition, the third content image 502 is differentially displayed from the folding area 520 that is convexly displayed.

Figure 6:
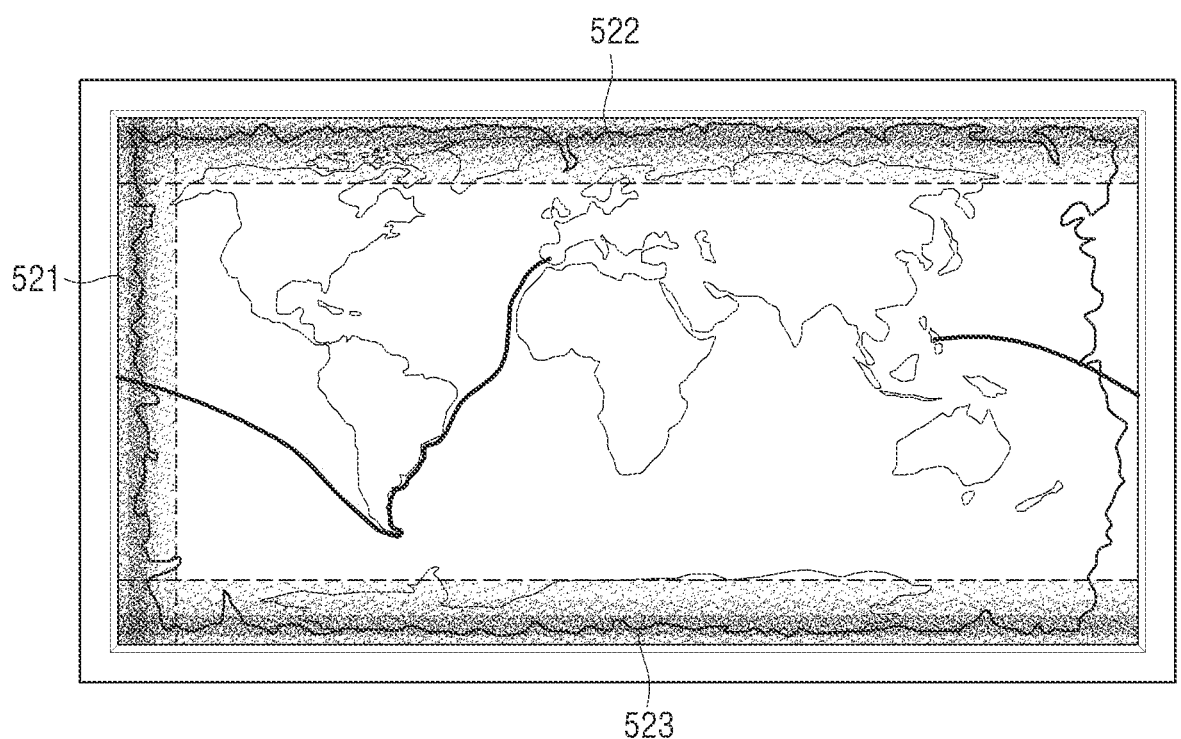

Referring to FIGS. 5C and 6, the folding area 520 may be displayed to correspond to a location of the first touch 510. For example, when first touch is detected at a left side based on a central region of an upper bezel touch sensor 141a, a folding area 521 may be displayed on a left edge of the first content image 500. When first touch is detected at an upper portion based on a central region of a left bezel touch sensor 141b, a folding area 522 may be displayed at an upper edge of the first content image 500. When first touch is detected at a right side based on a central region of a lower bezel touch sensor 141c, the folding area 520 may be displayed at a right edge of the first content image 500. When first touch is detected at a lower end based on a central region of a right bezel touch sensor 141d, a folding area 523 may be displayed at a lower edge of the first content image 500.

Figure 7:
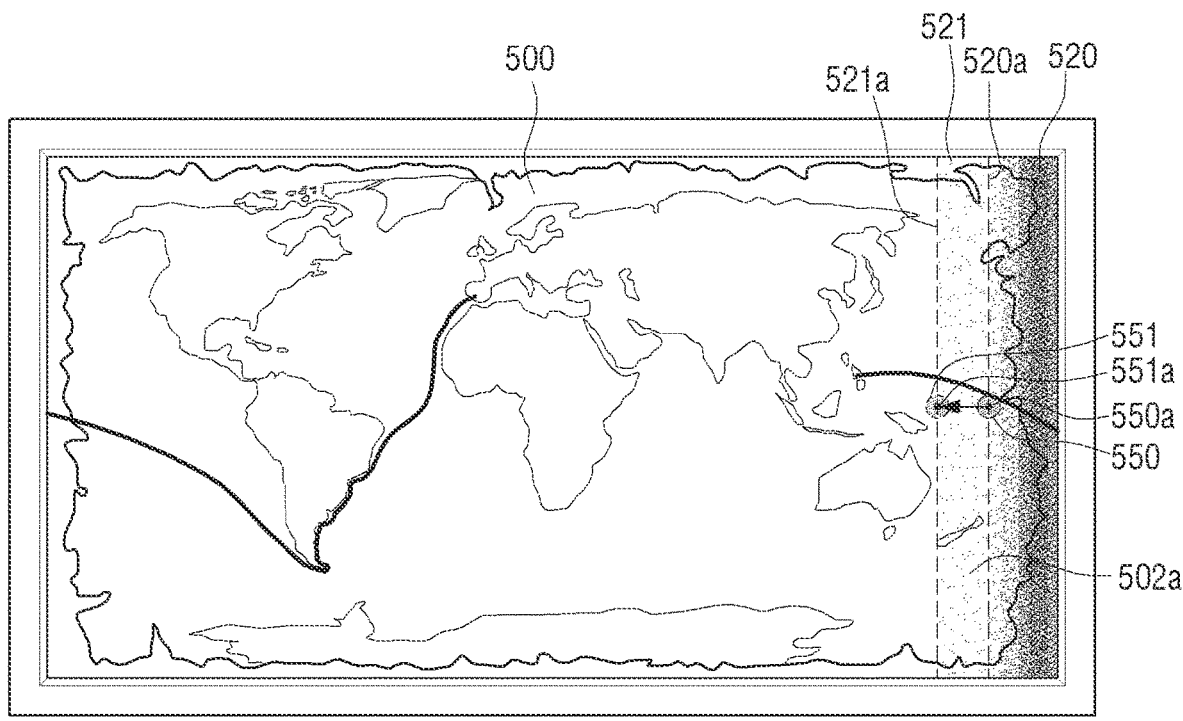

Referring to FIG. 7, an area of the folding area 520 may be changed. A user touches in operation 550 the folding line 520a. The control unit 110 may detect the initial touch 550 using the infrared type touch panel 178 and the touch panel controller. The control unit 110 may receive an initial touch location 550a (e.g., X11 and Y11 coordinates) corresponding to the initial touch 550 from the touch panel controller. The control unit 110 may store initial touch location information corresponding to the initial touch location 550a in the storage unit 185. The stored initial touch location information may further include ID for history management, a touch location, touch detection time, and touch information (e.g., a touch direction). The initial touch 550 may be generated by one of fingers including a thumb and/or a touchable input unit.

When continuous movement to a location of last touch 551 from a location of the initial touch 550 is input, the control unit 110 may receive a last touch location 551a (e.g., X12 and Y12 coordinates) corresponding to the last touch 551 from the touch panel controller. That is, the control unit 110 may receive coordinates of the location 551a in which touch is lastly released. The control unit 110 may store last touch location information corresponding to the last touch location 551a in the storage unit 185. The stored last touch location information may further include ID for history management, a touch location, touch detection time, and touch information (e.g., a touch direction).

The control unit 110 may move the folding line 520a in a direction of continuous movement of touch in response to continuous movement of the initial touch 550 on the folding line 520a.

As described above, when continuous movement to the location of the last touch 551 from the location of the initial touch 550 is input, the control unit 110 may display the folding area 521 having an increased area obtained via comparison with the folding area 520 in response to arrival of the last touch 551. The folding area 521 having the increased area may include a folding line 521a corresponding to the increased area. The adjacent folding area 500a of the first content image may also be changed to correspond to the folding area 521 having the increased area. The folding area 521 having the increased area may display a third content image 502a, the area of which is increased. In addition, in response to continuous movement of the initial touch 550, the control unit 110 may display a folding area (not shown) having an increased area compared with the folding area 520.

The folding area 521 having the increased area of FIG. 7 is substantially the same as the folding area 520 of FIG. 5C, and thus, a repeated description thereof will be omitted.

In operation S404 of FIG. 4, the first touch is moved to a folding area from the adjacent folding area 500a of the first content image.

Figure 5D:
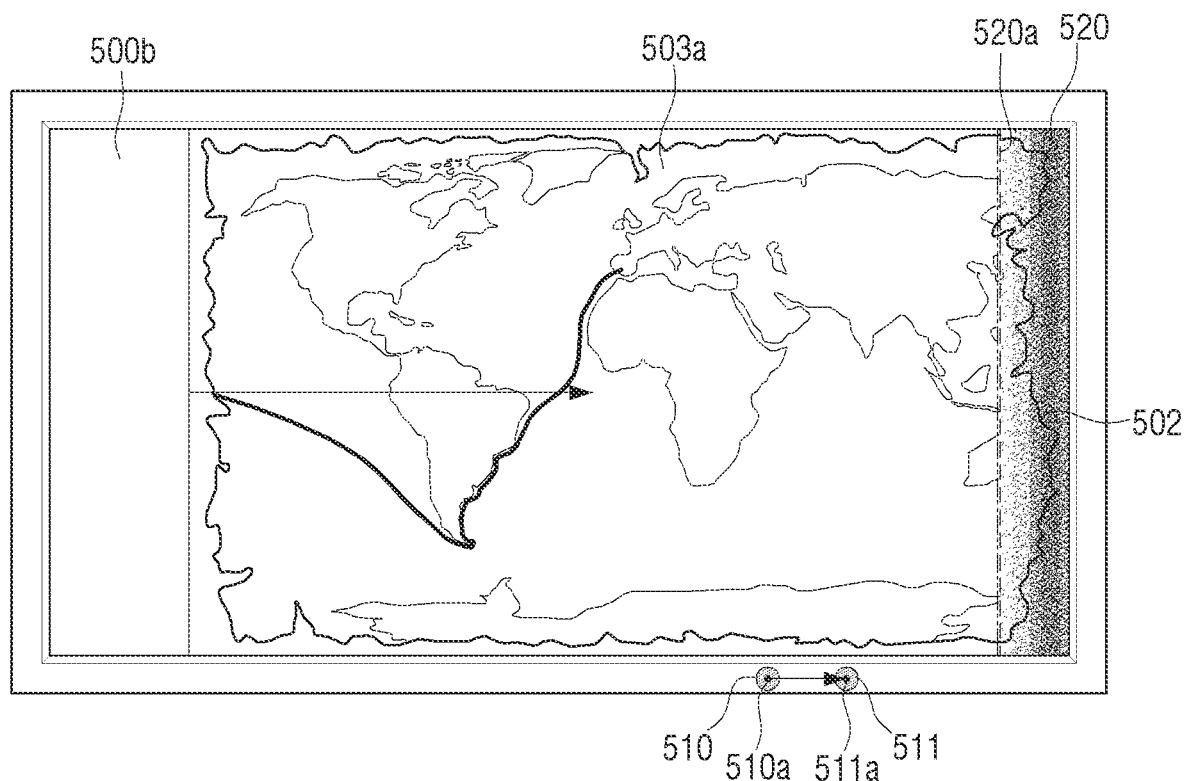
Figure 5E:
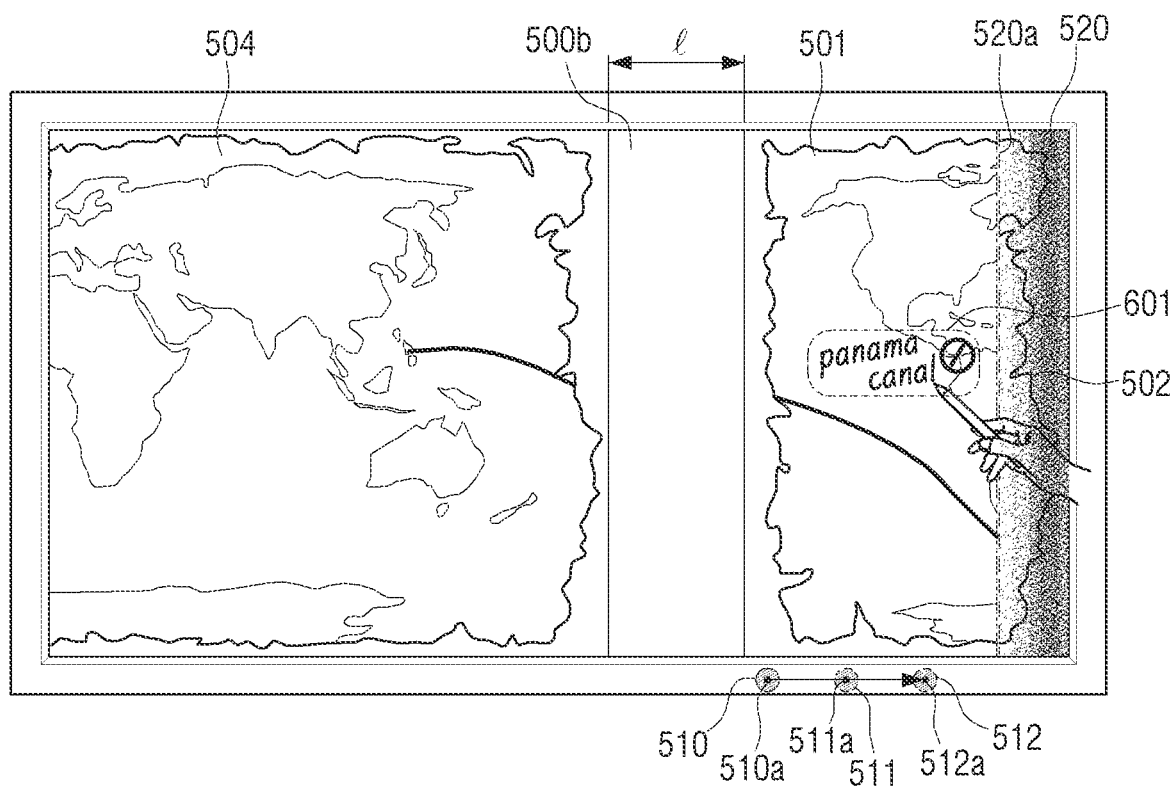

Referring to FIGS. 5D and 5E, the control unit 110 moves the first content image 500 to the folding area 520 from the adjacent folding area 500a of the first content image in response to holding time of the first touch 510. The control unit 110 may gradually reduce the area of the displayed first content image 500 in response to holding time of the first touch 510.

Movement of the first content image 500 may include an effect whereby the first content image 500 is wound around the folding area 520 like a roll from an adjacent folding area of the first content image or an effect whereby the first content image 500 is removed from the adjacent folding area of the first content image 500 to the folding area 520.

Holding time of the first touch 510 may include continuous contact of the first touch 510 to the bezel 10 or continuous movement of the first touch 510. The control unit 110 may detect continuous movement (e.g., a plurality of X and Y coordinates corresponding to continuous movement of touch) of the first touch 510 using the bezel touch sensor 141 and the touch sensor controller. The control unit 110 may store location information of a plurality of touches corresponding to a plurality of touch locations corresponding to continuous movement of the first touch, in the storage unit 185. The continuous movement of the first touch 510 may refer to continuous holding of contact between the first touch and a bezel.

Continuous movement of the first touch 510 refers to continuous touch gestures (e.g., drag or flick, movement to 512a from 510a) of one touch to last first touch 512 from the initial first touch 510. In addition, continuous movement of the first touch 510 may refer to continuous touch gestures (e.g., movement to 511a from 510a) of one touch to an intermediate first touch 511 from the initial first touch 510. It would be easily understood by those of ordinary skill in the art that the first touch gesture may include various touch gestures as well as rotation.

In the case of touch-on in which contact between the first touch 510 and the bezel 10 is maintained, the control unit 110 may move the first content image 500. In the case of touch-release in which contact between the first touch 510 and the bezel 10 is released, the control unit 110 may stop movement of the first content image 500. When contact between the first touch 510 and the bezel 10 is released, it means that movement of the first content image 500 is completed.

Figure 8:
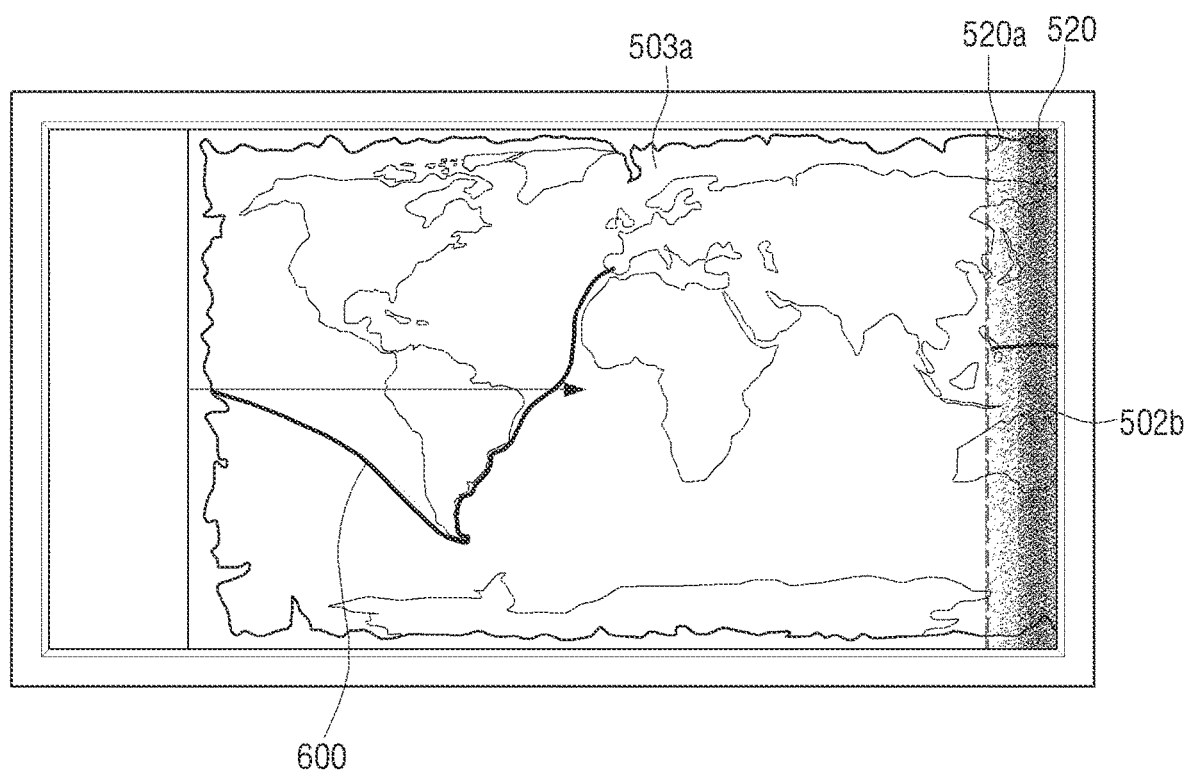

Referring to FIG. 8, in response to movement of the first content image 500, the control unit 110 may change the third content image 502 displayed on the folding area 520 to a third content image 502b. The third content image 502 refers to a content image that is not changed in response to movement of the first content image 500. The third content image 502b refers to a content image that is changed in response to movement of the first content image 500.

A difference between the third content image 502 and the third content image 502b refers to a difference in a reference for winding or removing the first content image 500. The first content image 500 may be wound or removed based on the folding line 520a. In this case, the third content image 502 is not changed. In addition, the first content image 500 may be wound or removed based on an edge of a bezel 10a facing the folding line 520a through the folding area 520. In this case, the third content image 502b may be changed in response to winding and/or removing of the first content image 500.

When the first content image 500 is moved, the path 600 is moved together with the first content image 500 based on an upper left apex. In addition, in response to movement of the first content image 500, when a portion of the first content image 500 is not displayed, a portion of the path 600 of the first content image 500 that is not displayed may not be displayed.

In response to movement of the first content image 500, the control unit 110 may display the second blank space 500b outside a second edge of the first content image 500. A length 1 of the second blank space 500b may be changed to correspond to the horizontal length of the display unit 170. According to an embodiment of the present disclosure, the length of the second blank space 500b may be $2/15$ of the horizontal length of the display unit 170. It would be easily understood by those of ordinary skill in the art that the length of the second blank space 500b may be changed by a manufacturer or a user.

The control unit 110 may display a transition content image 503a in response to movement of the first content image 500. The transition content image 503a refers to the first content image 500, an area of which is reduced as the first content image 500 is moved in a direction toward the folding area 520. An area of the transition content image 503a is smaller than an area of the first content image 500.

A moving speed of the first content image 500 may be constant (e.g., 100 mm/s, changeable) or non-constant in response to holding time of the first touch 510. When the moving speed of the first content image 500 is constant, the moving speed of the first content image 500 is constant in response to the holding time of the first touch 510. When the moving speed of the first content image 500 is non-constant, moving speed of the first content image 500 may linearly increase and decrease like a sine curve (e.g., 0 m/s→200 m/s→0 m/s). In addition, when the moving speed of the first content image 500 is non-constant, the moving speed of the first content image 500 may promptly increase (e.g., up to $1/4$ of a period) and gradually decrease (e.g., up to 4/4 from $1/4$ of a period).

Referring to FIG. 5E, when holding time of the first touch 510 is increased, the control unit 110 may display a fourth content image 504 consecutively to the second blank space 500b. The fourth content image 504 may be displayed from an edge of the initial first content image 500 that is wound or removed by the folding area 520. In addition, when holding time of the first touch 510 is increased, the control unit 110 may display only the second blank space 500b without the fourth content image 504. In this case, the length of the second blank space 500b may exceed $11/15$ of the horizontal length of the display unit 170. The length of the second blank space 500b may also be changed by a user or a manufacturer. An area of the second blank space 500b may be smaller than an area of the first content image 500.

In operation S405 of FIG. 4, when movement is completed, a second content image is displayed.

Referring to FIG. 5E, a user releases the first touch 510 from the bezel 10. The control unit 110 may detect the release (e.g., a case in which additional continuous movement of the first touch 510 is not detected) of the first touch 510 using the bezel touch sensor 141 and the touch sensor controller. The control unit 110 may store location information of a last first touch location 512a corresponding to the release location (e.g., the last first touch location 512a) of the first touch 510 in the storage unit 185.

When movement of the first content image 500 is completed, the control unit 110 displays a second content image. The release of the first touch 510 may include release of the first touch 510 from the bezel 10 or stop of continuous movement of the first touch 510 from the bezel 10.

When the first touch 510 is released, the control unit 110 may stop movement of the first content image 500. The second content image 501 refers to the first content image 500, movement of which is stopped.

The control unit 110 may not suddenly display the second content image 501. When the first touch 510 is released and movement of the first content image 500 is stopped, the first content image 500, movement of which is stopped, is the second content image 501. In addition, when the first touch 510 is released and movement of the transition content image 503a is stopped, the transition content image 503a, movement of which is stopped, may be the second content image 501.

In response to release of the first touch 510, an area of the second content image 501 is changed. The second content image 501 may have a minimum area that is not changed even if holding time of the first touch 510. Even if holding time of the first touch 510 is increased, the minimum area of the second content image 501 may be the same a set minimum area.

According to an embodiment of the present disclosure, the minimum area of the second content image 501 may be $3/15$ of an area of the display unit 170. According to another embodiment of the present disclosure, the minimum area of the second content image 501 may be $1/15$ of the display unit 170. It would be easily understood by those of ordinary skill in the art that the minimum area of the second content image 501 is changed by a manufacturer or a user.

The control unit 110 may provide feedback to the user in response to display of the second content image 501. The provided feedback may be one of visual feedback and audible feedback and may be provided to the user. The control unit 110 may provide both visual feedback and audible feedback to the user.

Visual feedback may be displayed by showing a visual effect (e.g., an animation effect such as a separate image or fading applied to a separate image) responding to display of the second content image 501 differentially from a plurality of objects displayed on the display unit 170. Audible feedback may be output through the audio output unit 180 as sound responding to display of the second content image 501.

When the touch panel 175 of the display apparatus 100 is the capacitive type touch panel 176 or the resistive type touch panel 177, the control unit 110 may provide tactile feedback to the user using a vibration motor (not shown).

In environment settings of a portable device, feedback to be provided (e.g., visual feedback and audible feedback) may be selected and/or changed. In addition, time (e.g., 500 msec) to provide at least one feedback to the user may be input and/or changed by the user.

The user may additionally input a location and name 601 of the Panama Canal to the display world map using a finger including a thumb or an input unit. When the location and name 601 of the Panama Canal is input to an infrared type touch panel, the control unit 110 may display and overlay a line and text corresponding to continuous movement of detected touch on the world map.

In operation S406 of FIG. 4, double tap is detected from a second content image or a bezel.

Figure 5F:
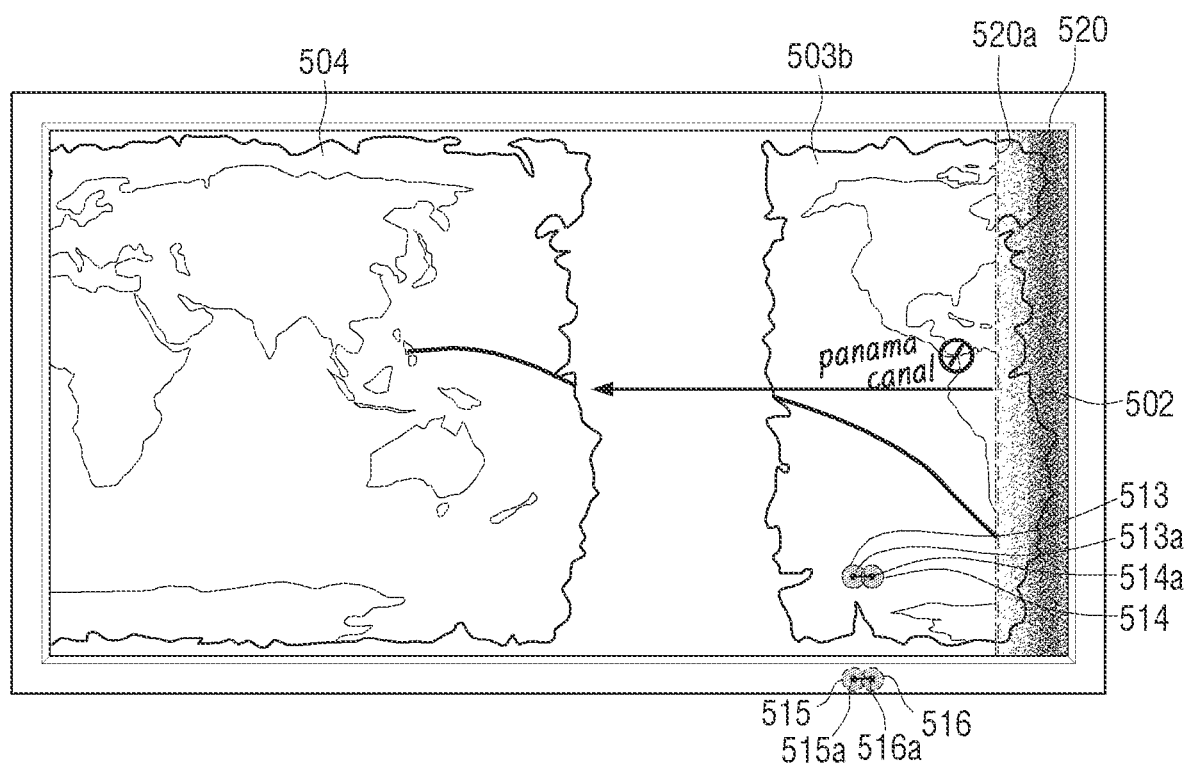

Referring to FIG. 5F, the user inputs one of double taps 513 and 514 to the second content image 501 and double taps 515 and 516 to the bezel 10. The control unit 110 may detect the double taps 513 and 514 on the second content image 501 using the infrared type touch panel 178 and the touch panel controller. In addition, the control unit 110 may receive double tap touch location information (e.g., a plurality of X and Y coordinates) of double tap locations 513a and 514a corresponding to the double taps 513 and 514 of the second content image 501 from the touch panel controller.

The control unit 110 may detect the double taps 515 and 516 using the bezel touch sensor 141 and the touch sensor controller. The control unit 110 may receive double tap touch location information (e.g., a plurality of X and Y coordinates) of double tap locations 515a and 516a corresponding to the double taps 515 and 516 from the touch sensor controller. The control unit 110 may store double tap location information corresponding to the double tap locations 513a, 514a, 515a, and 516a in the storage unit 185. Double tap may be generated by one of fingers including a thumb or a touchable input unit.

When one of the double taps 513 and 514 from the second content image 501 and the double taps 515 and 516 from the bezel 10 is not detected, the method proceeds to operation S408.

In operation S407 of FIG. 4, a current image is restored to the first content image 500.

Figure 5G:
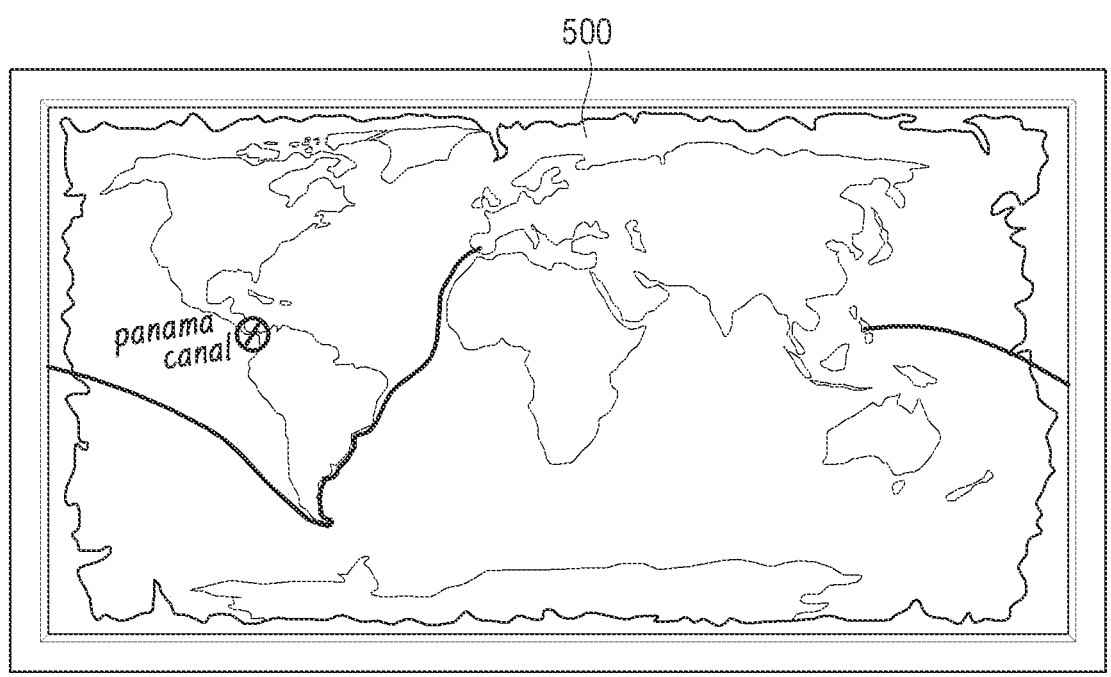

Referring to FIGS. 5F and 5G, when one of the double taps 513 and 514 from the second content image 501 and the double taps 515 and 516 from the bezel 10 is detected, the control unit 110 restores the second content image 501 to the first content image 500. When one of the double taps 513 and 514 from the second content image 501 and the double taps 515 and 516 from the bezel 10, the control unit 110 may move the second content image 501 in an opposite direction to the folding area 520. When the second content image 501 is moved, the second content image 501 may be a transition content image 503b.

Movement of a second content image 500 may refer to movement of an upper left apex like movement of the first content image 500. When the second content image 501 is moved, the control unit 110 may move the path 600 and the location and name 601 of the Panama Canal that is additionally input to the second content image 501 together.

When the second content image 501 is restored to the first content image 500, the control unit 110 may display the location and name 601 of the Panama Canal together with the first content image 500.

Moving speed of the transition content image 503b may be the same or different from moving speed of the first content image 500.

When the second content image 501 is restored to the first content image 500, the control unit 110 may remove the folding area 520. In addition, the control unit 110 may also remove the folding line 520a.

The control unit 110 may provide feedback responding to movement of the second content image 501 to the user. Feedback of operation S407 of FIG. 4 is substantially the same as operation S405 of FIG. 4, and thus, a repeated description thereof will be omitted.

In operation S407 of FIG. 4, when the first content image is displayed, the method of displaying an image by the display apparatus is terminated.

When the method returns to operation S406 of FIG. 4, if both double tap from the second content image and double tap from the bezel are not detected, operation S408 proceeds.

In operation S408 of FIG. 4, second touch is detected from the bezel.

Figure 5H:
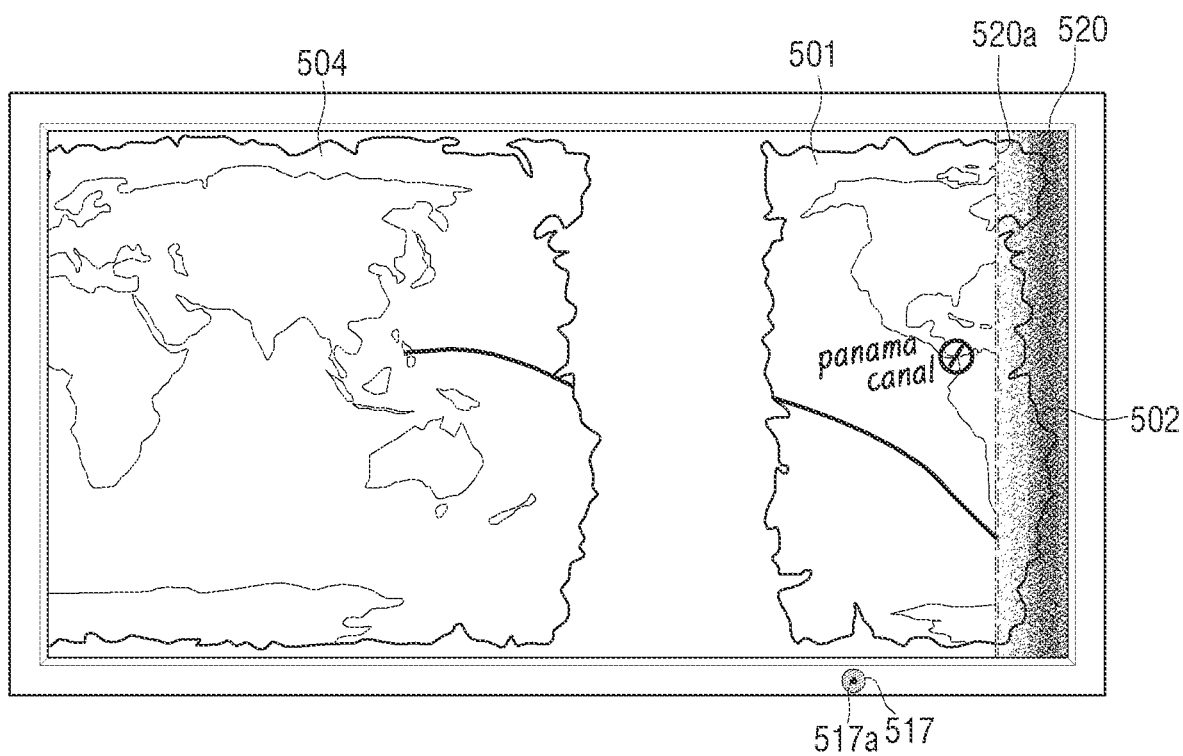
Figure 5I:
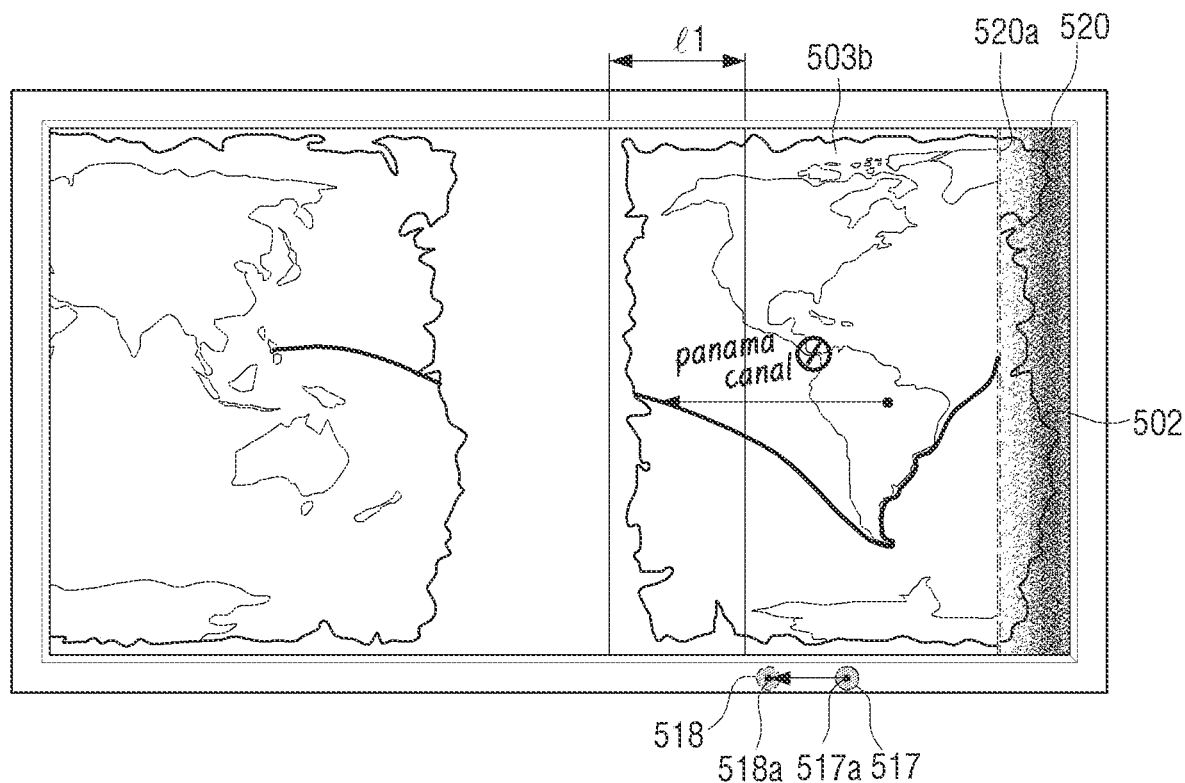

Referring to FIG. 5H, the user puts second touch 517 on the bezel. The control unit 110 may detect the second touch 517 from the bezel. The control unit 110 may detect the second touch 517 using the bezel touch sensor 141 and the touch sensor controller. The control unit 110 may receive second touch location information (e.g., X and Y coordinates) of a second touch location 517a corresponding to the second touch 517 from the touch sensor controller. The control unit 110 may store the second touch location information corresponding to the second touch location 517a in the storage unit 185.

Touch or hovering of operation S408 of FIG. 4 is substantially the same as operation S402 of FIG. 4, and thus, a repeated description thereof will be omitted.

In operation S408 of FIG. 4, when the second touch is not detected from the bezel, a method of displaying an image by the display apparatus is terminated.

In operation S409 of FIG. 4, an area of the second content image is changed.

Referring to FIG. SI, the control unit 110 moves the second content image 501 in an opposite direction to the folding area 520 in response to holding time of the second touch 517. The control unit 110 may gradually increase the area of the displayed second content image 501 in response to holding time of increase in holding time of the second touch 517. The area of the fourth content image 504 may be reduced in response to increase in holding time of the second touch 517.

Movement of the second content image 501 may include unwinding a partial area of the wound first content image 500 from the folding area 520 or displaying a partial area of the removed first content image 500 from the folding area 520.

Holding time of the second touch 517 may include continuous contact of the second touch 517 to the bezel 10 or continuous movement (e.g., movement to 518a from 517a) of the second touch 517.

Release of the second touch 517 may include release of the second touch 517 from the bezel 10 or release of continuous movement of the second touch 517 from the bezel 10. When the second touch 517 is released, the control unit 110 may stop movement of the second content image (or a transition content area).

Referring to FIG. SI, the area of the second content image 501 is increased by as much as a moving length 11. The control unit 110 may display of the location and name 601 of the Panama Canal together with the second content image 501, the area of which is increased.

In operation S409 of FIG. 4, holding time of touch, release of touch, and change in area of content image are substantially the same as operations S404 and S405 of FIG. 4, and thus, a repeated description thereof will be omitted.

In operation S409 of FIG. 4, when the area of the second content image is changed, the method of displaying an image by the display apparatus is terminated.

Figure 9:
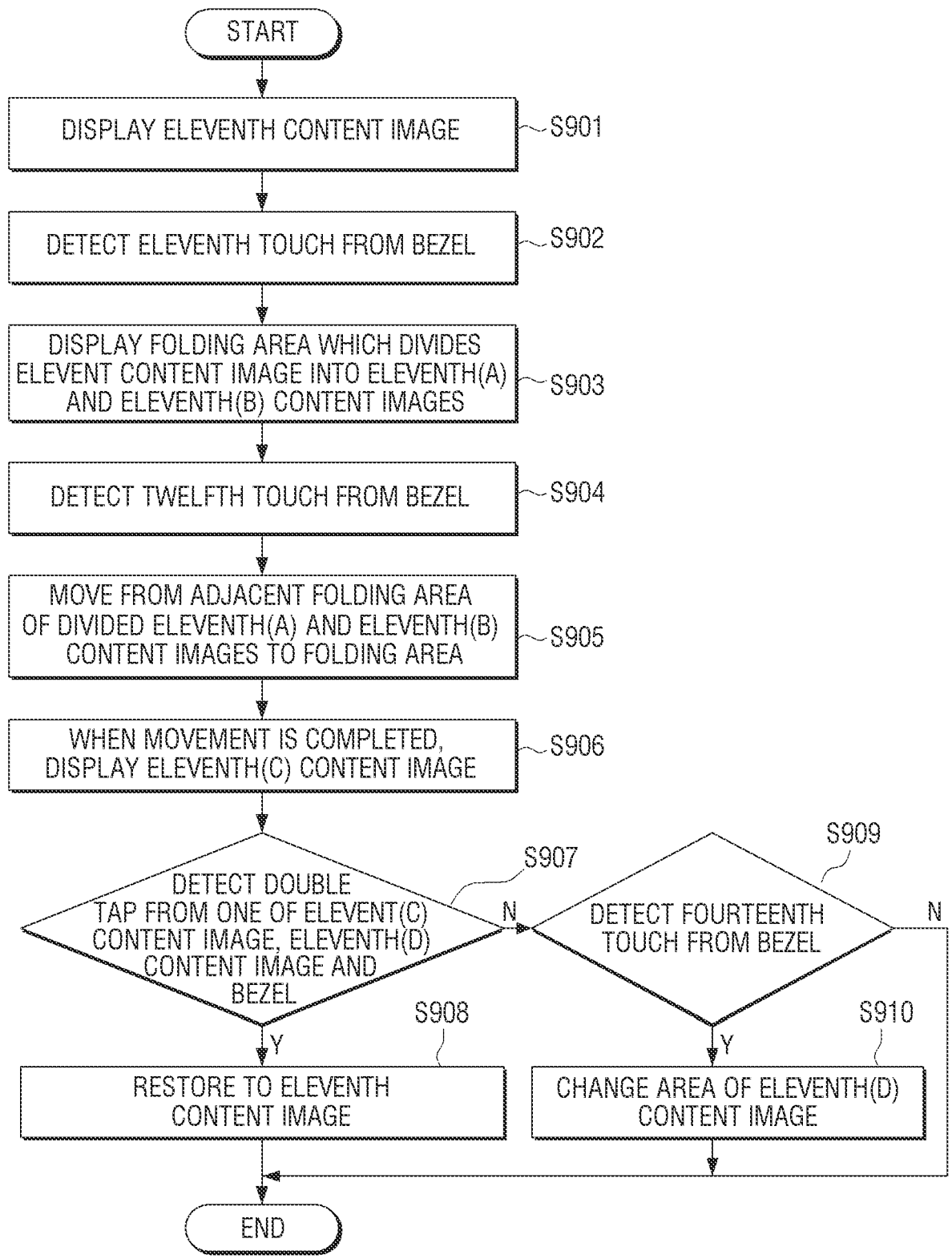
FIG. 9 is a schematic flowchart of a method of displaying an image by a display apparatus according to an embodiment of the present disclosure.

FIG. 9 is a schematic flowchart of a method of displaying a screen by a display apparatus according to another embodiment of the present disclosure.

FIGS. 10A, 10B, 10C, 10D, 10E, 10F, 10G, 10H, 11A, and 11B illustrate examples of a screen of a display apparatus according to another embodiment of the present disclosure.

Hereinbelow, a display method will be explained with reference to FIGS. 10A to 11B.

Referring to FIG. 9, an eleventh content image is displayed in operation 901.

Figure 10A:
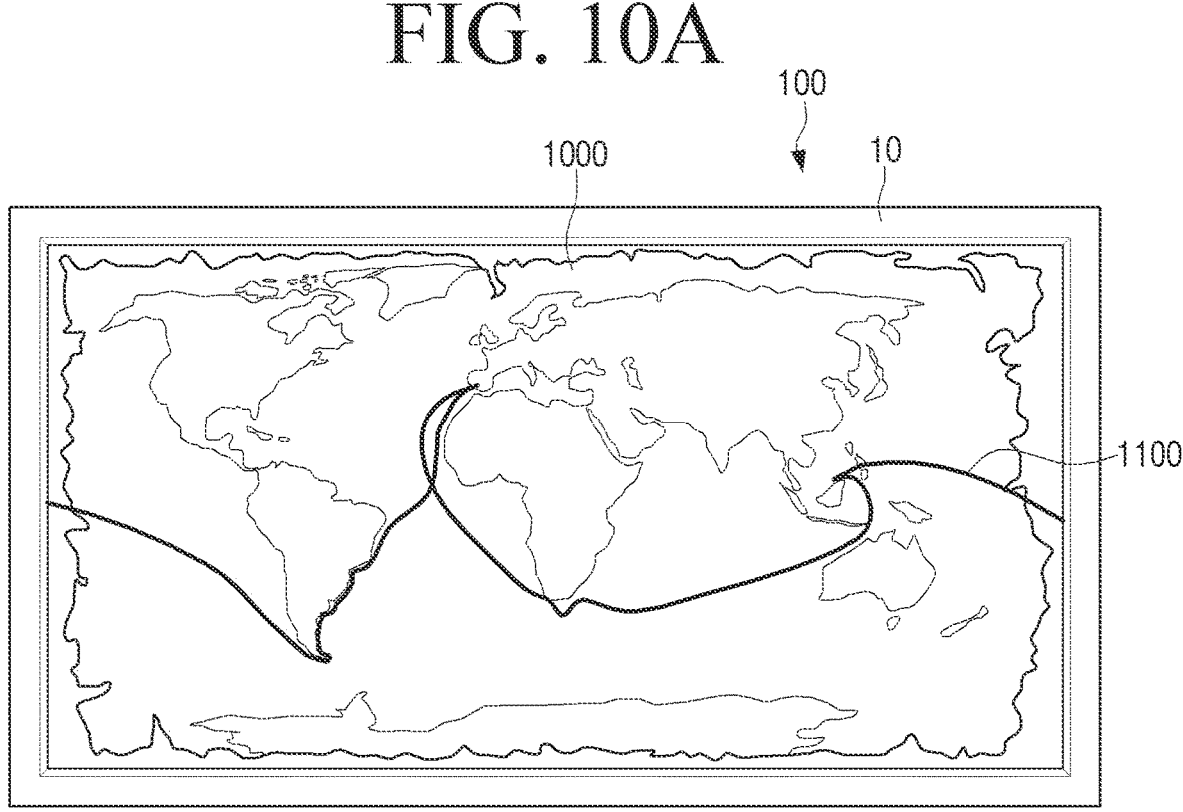
FIGS. 10A, 10B, 10C, 10D, 10E, 10F, 10G, and 10H illustrate examples of a screen of a display apparatus according to various embodiments of the present disclosure.

Referring to FIG. 10A, the eleventh content image 1000 is displayed on the display unit 170 of the display apparatus 100. When an educational application is executed, a content image of the educational application may be displayed. Displayable content may be a textbook, test paper, or homework. In addition, when a web browser is executed, the content image may be a web page. The content image 1000 illustrated in FIG. 11A indicates a world map.

A teacher may teach a class using the content image 1000. For example, when the teacher teaches a class about Magellan, he or she may add a path 1100 of a navigation path of Magellan to the displayed world map using a finger including a thumb or an input unit.

When the path 1100 of the navigation path of Magellan is input to the infrared type touch panel 178, a control unit 110 may display and overlay a line corresponding to continuous positions of detected touch on the world map. The path 1100 may be a separate layer from a layer corresponding to the eleventh content image 1000. The control unit 110 may add, remove, and move the path 1100 as a separately layer according to user input. Change in the separate layer may not affect a layer of the eleventh content image 1000.

A reference coordinate of the path 1100 is an upper left apex of the eleventh content image. A coordinate of coordinate of the upper left apex may be (0, 0). Each position of the added path 1000 may be expressed as a relative coordinate based on the upper left apex. Movement of the eleventh content image 1000 may refer to movement of the upper left apex.

In response to the movement of the reference coordinate, addable objects (e.g., writing on the whiteboard, an image, a text, a moving picture, or the like) to the eleventh content image 1000 may also be displayed on the same position as the eleventh content image 1000.

The eleventh content image 1100 may be displayed with a size of an entire screen of the display unit 170. In addition, the eleventh content image 1000 may include a first blank space at each edge.

In operation of S902 of FIG. 9, the eleventh touch is detected from a bezel.

Figure 10B:
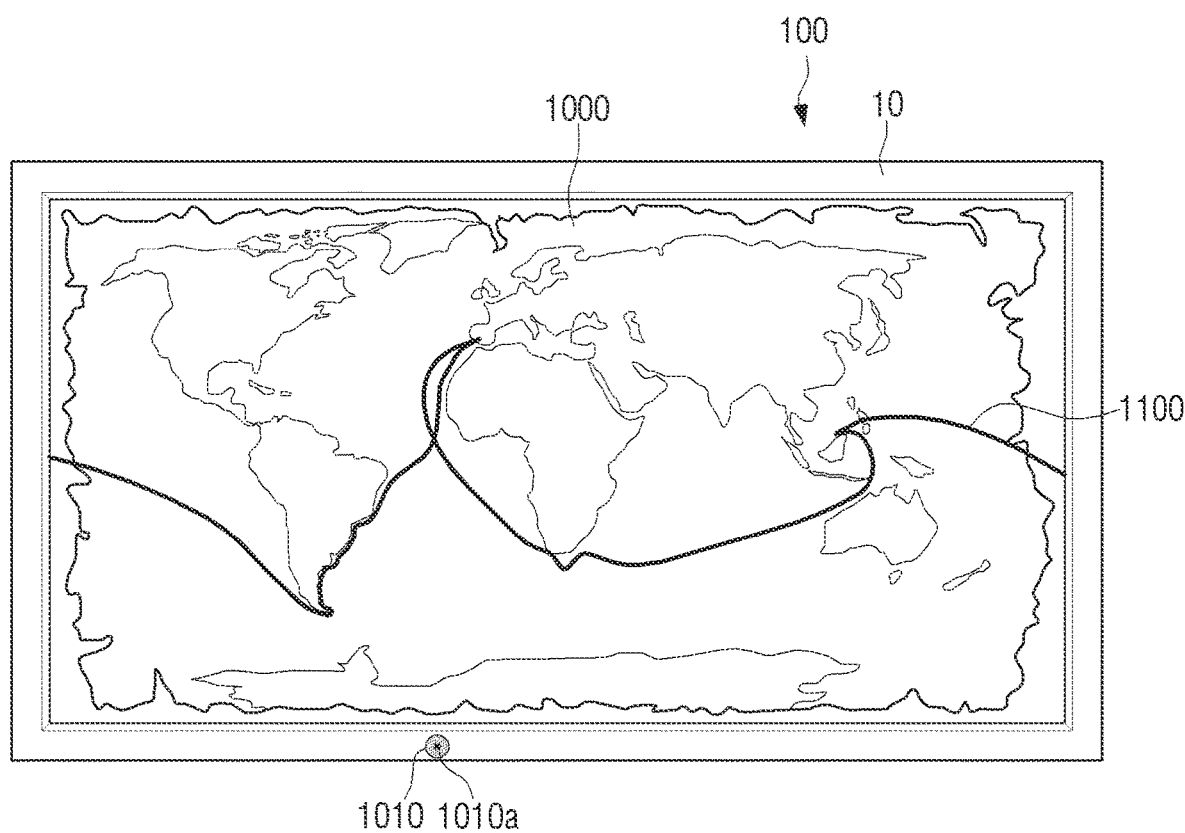

Referring to FIG. 10B, a user puts the eleventh touch (e.g., tap 1010) on the bezel 10 of the display apparatus 100 in which the eleventh content image 1000 is displayed. The control unit 110 may detect the eleventh touch 1010 using the bezel touch sensor 141 and a touch controller (not shown). The control unit 110 may receive first touch location information (for example, coordinates of X41 and Y41) of an eleventh touch location 1110a corresponding to the eleventh touch 1010 from the touch sensor controller.

The control unit 110 may store the eleventh touch location information corresponding to the eleventh touch location 1010a in a storage unit 185. The stored eleventh touch location information may further include ID for history management, a touch location, touch detection time, and a detection voltage (or current). The eleventh touch 1010 may be generated by one of fingers including a thumb and/or a touchable input unit. That the eleventh touch 1010 according to another embodiment of the present disclosure may be distinguished from various touches (e.g., the first touch and the second touch) detected in various embodiments of the present disclosure may be easily understood by those skilled in the art.

According to another embodiment of the present disclosure, the user may include a teacher, a student, or a person who uses the display apparatus 100.

The control unit 110 may detect eleventh hovering (not shown) using the bezel touch sensor 141 and the touch sensor controller. The control unit 110 may receive eleventh hovering location information of an eleventh hovering location (not shown) corresponding to the eleventh hovering from the touch sensor controller.

The control unit 110 may store the eleventh hovering location information corresponding to the eleventh hovering location in the storage unit 185. The stored eleventh hovering location information may contain a hovering location, hovering detection time, or a detection voltage (or current). The eleventh hovering may be generated by one of fingers including a thumb or a touchable input unit.

In addition, a user touch inputted to the bezel 10 may be a plurality of touches. The control unit 110 may detect a plurality of touches using the bezel touch sensor 141 and the touch sensor controller.

In operation S903 of FIG. 9, a folding area which divides the eleventh content image into the eleventh (a) and the eleventh (b) content images is displayed.

Figure 10C:
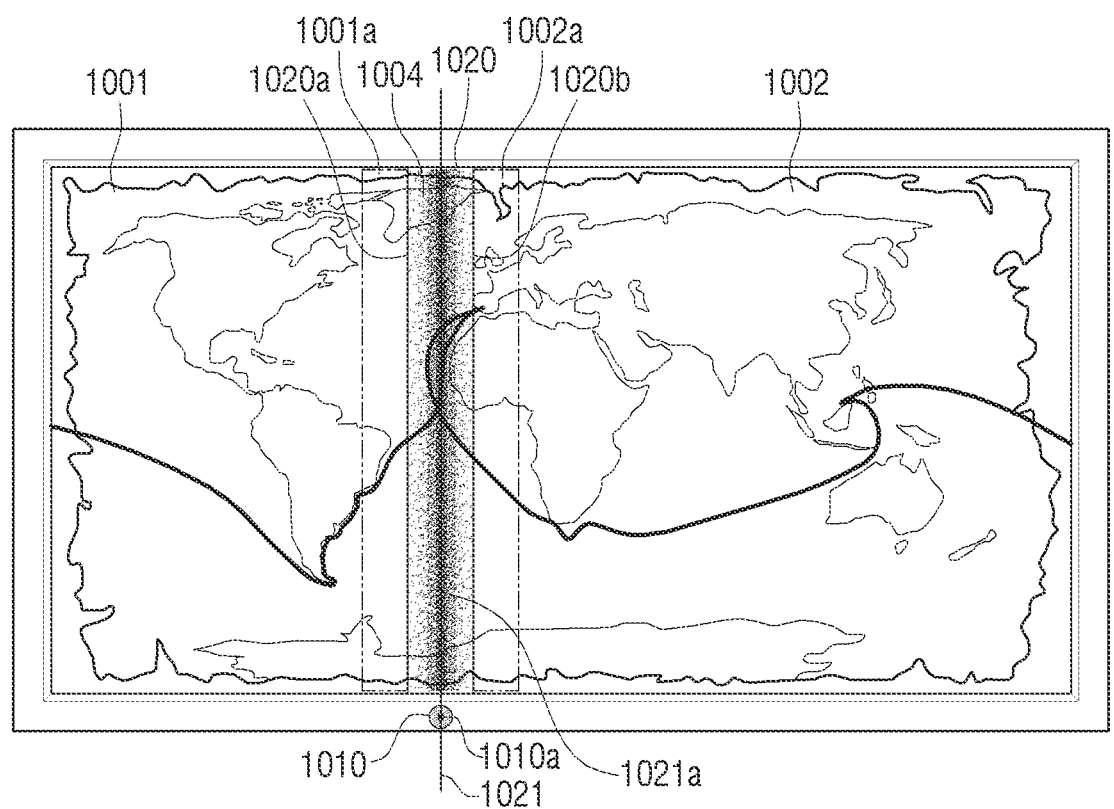

Referring to FIG. 10C, when the eleventh touch 1010 is detected, the control unit 110 displays the folding area 1020 at an eleventh content image 1000. By the folding area 1020, the eleventh content image 1000 may be divided into a plurality of sub content images (e.g., the eleventh (a) content image 1001 and the eleventh (b) content image 1002). The sub content image 1001 is a part of the first content image (1000) which is divided by the folding area 1020. In addition, the sub content image 1002 may be a part (for example, another side of the sub content image 1001) of the first content image 1000 which is divided by the folding area 1020. When the sub content images 1001 and 1002 are added, the sub content images may be the first content image 1000. In addition, the added sub content images 1001 and 1002 may have a smaller image size than the first content image 1000 by the folding area 1020.

The folding area 1020 may be positioned based on the virtual extension line 1021 which passes the eleventh touch location 1010a and is extended to the eleventh content image 1000. The imaginary extension line 1021 which passes by the folding area 1020 may be overlaid on the central line 1021a of the folding area 1020. In addition, the imaginary extension line 1021 may be spaced apart from the central line 1021a of the folding area 1020. For example, the central line 1021a of the folding area 1020 may be located at an area which is lower than 100 mm (for example, changeable by setting) of the left or right side of the imaginary extension line 1021.

An area of the folding area 1020 may be ⅟₁₅ of the area of the display unit 170. An area of one side of the folding area 1020 based on the extension line 1021 may be ⅟₃₀ (e.g., the left area and the right area may be substantially the same). In addition, based on the extension line 1021, size of the left area and the right area of the folding area 1020 may be different. The area of the folding area 1020 based on the extension line 1021 may be ⅟₃₀ (e.g., the left area and the right area are substantially the same). In addition, based on the extension line 1021, the left area and the right area may be different. The area of the folding area 1020 may be changed in response to the area of the display unit 170. The larger the area of the display unit 170 is, the larger the folding area 1020 may be. It would be easily understood by those of ordinary skill in the art that the area of the folding area 1020 is changed by a manufacturer or a user.

The folding area 1020 may be convexly (or concavely) displayed like a roll shaft around which a roll is woundable. The folding area 1020 may overlap the eleventh content image 1000 and may be displayed as a separate area. The folding area 1020 may overlap the eleventh (a) content image 1001 and the eleventh (b) content image 1002 and may be displayed as a separate area. The folding area 1020 may be differentially displayed from the eleventh content images 1001 and 1002 based on the central line 1021a (e.g., according to gradation effect). The folding area 1020 may be differentially displayed from the eleventh content images 1001 and 1002 (e.g., according to gradation effect).

The folding area 1020 may be displayed to be spaced apart from each bezel 10 (e.g., where imaginary extension line 1020 passes by) by as much as a predetermined distance (e.g., 2 mm, changeable). The folding area 1020 may include a plurality of folding lines 1020a and 1020b. The folding area 1020 may be differentiated from the eleventh content images 1001 and 1002 by the folding lines 1020a and 1020b.

The adjacent folding area 1001a of the eleventh (a) content image 1001 may refer to an imaginary area spaced apart from central line 1021a of the folding line 1021a in an opposite direction to the folding area 1020 by a predetermined distance (e.g., 30 mm, changeable). The folding line 1020a may be displayed between the folding area 1020 and the adjacent folding area 1001a of the eleventh content image 1001.

The folding area 1020 may display the thirteenth content image 1004. The folding area 1020 may be displayed using a portion of the edge of the eleventh content images 1001 and 1002. In this case, the third content image 1004 displayed on the folding area 1020 may be a portion of the edge of the eleventh content images 1001 and 1002. For example, the third content image 1004 which is displayed on the folding area 1020 may be a part of an edge of the eleventh (a) content image 1001 and the eleventh (b) content image 1002 which are displayed based on the central line 1021a. The third content image 1004 which is displayed on the folding area 1020 may be a part of edges of the eleventh content images 1001 and 1002.

An area of the thirteenth content image 1004 is smaller than the eleventh content image 1000. The thirteenth content image 1004 may be convexly displayed to correspond to the folding area 1020 that is convexly displayed. In addition, the thirteenth content image 1004 is differentially displayed from the folding area 1020 that is convexly displayed. In addition, the thirteenth content image 1002 may be differentially displayed from the folding area 1020 which is convexly or concavely displayed.

The folding area 1020 may be displayed to correspond to a location of the eleventh touch 1010. For example, when eleventh touch is detected at an upper bezel touch sensor 141a, a folding area (not shown) which divides the eleventh content image 1000 to left and right may be displayed. When eleventh touch is detected at a left bezel touch sensor 141b, a folding area (not shown) which may divide the eleventh content image 1000 up and down may be displayed. When eleventh touch is detected at a right bezel touch sensor 141c, a folding area (not shown) which divides the eleventh content image 1000 left and right may be displayed.

Figure 12A:
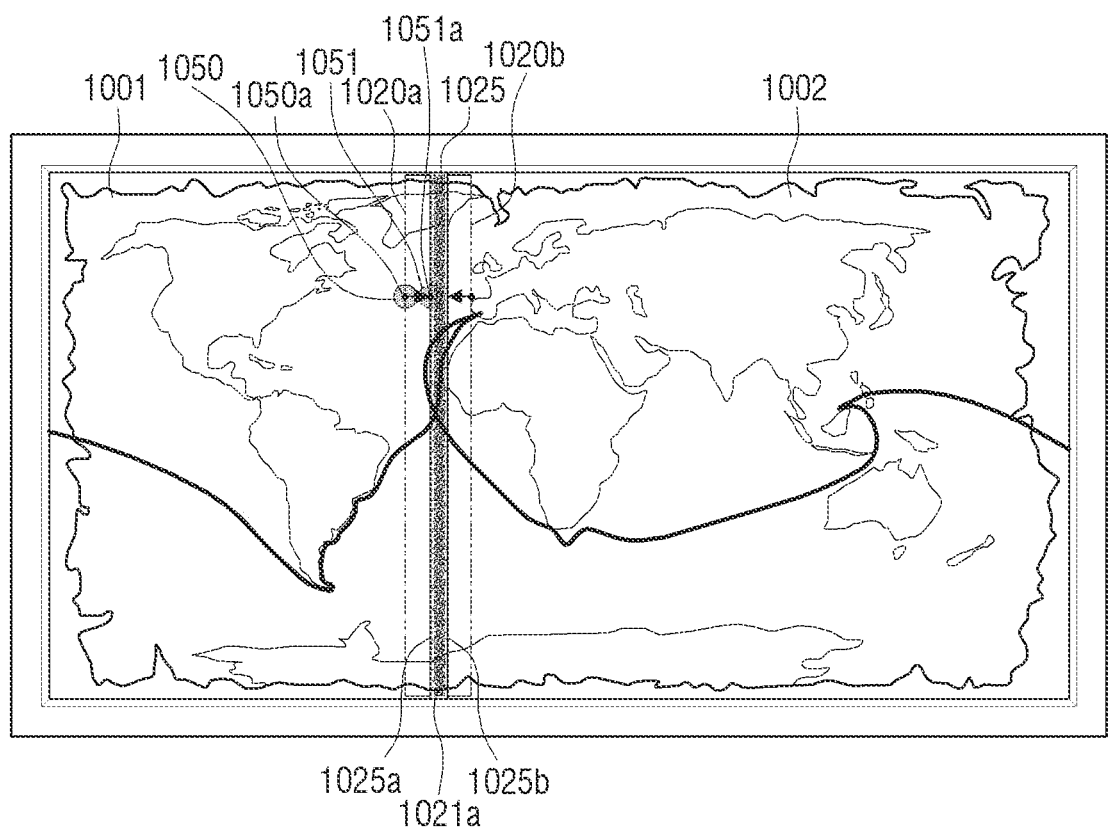
FIGS. 12A and 12B illustrate examples of a screen of a display apparatus according to various embodiments of the present disclosure.
Figure 12B:
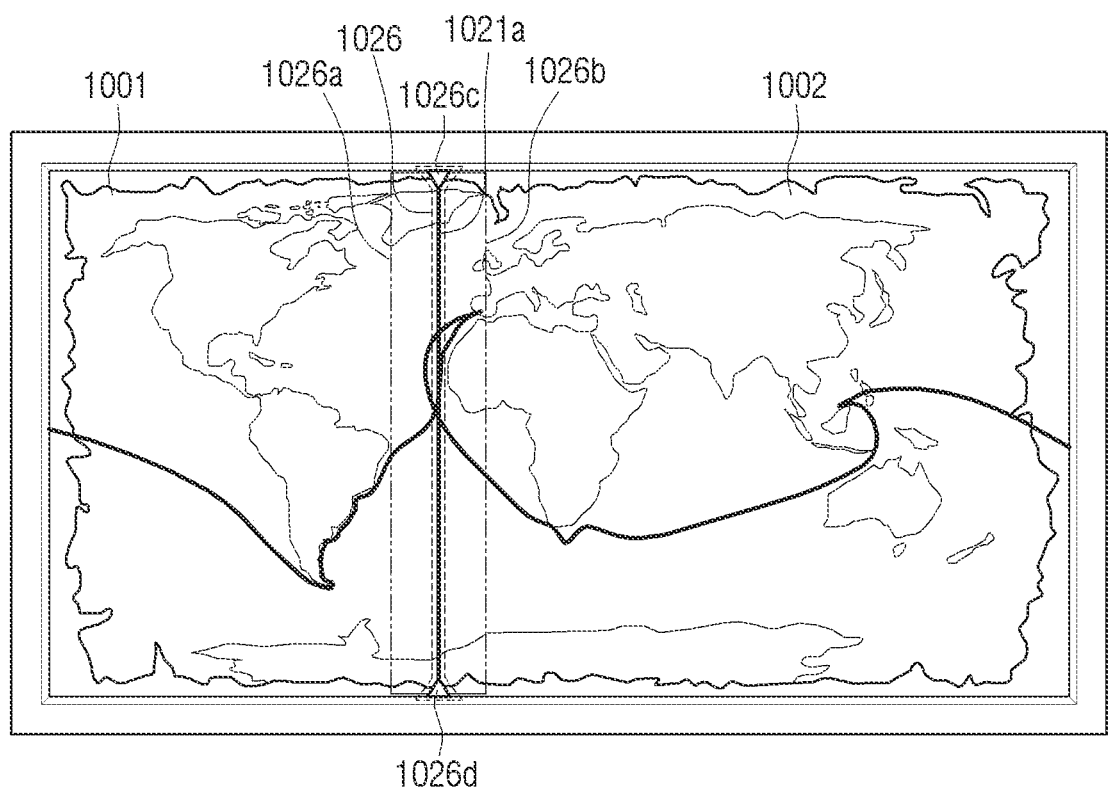

FIGS. 12A and 12B illustrate examples of a screen of a display apparatus according to various embodiments of the present disclosure.

Referring to FIGS. 12A and 12B, an area of the folding area 1020 may be changed. A user touches the folding line 1020a. The control unit 110 may detect the touch 1050 using the infrared type touch panel 178 and the touch panel controller. The control unit 110 may receive a touch location 1050a (e.g., X51 and Y51 coordinates) corresponding to the touch 1050 from the touch panel controller. The control unit 110 may store touch location information corresponding to the initial touch location 1050a in the storage unit 185. The stored touch location information may further include ID for history management, a touch location, touch detection time, and touch information (e.g., a touch direction). The initial touch 1050 may be generated by one of fingers including a thumb and/or a touchable input unit.

When continuous movement to a location of last touch 1051 from a location of the touch 1050 is input, the control unit 110 may receive a touch location 1051a (e.g., X52 and Y52 coordinates) corresponding to the touch 1051 from the touch panel controller. That is, the control unit 110 may receive coordinates of the location 1051a in which touch is lastly released. The control unit 110 may store last touch location information corresponding to the last touch location 1051a in the storage unit 185. The stored last touch location information may further include ID for history management, a touch location, touch detection time, and touch information (e.g., a touch direction).

The control unit 110 may move the folding line 1020a in a direction of continuous movement of touch in response to continuous movement of the initial touch 1050 on the folding line 1020a.

As described above, when continuous movement to the location of the last touch 1051 from the location of the initial touch 1050 is input, the control unit 110 may display the folding area 1025 having a decreased area obtained via comparison with the folding area 1020 in response to arrival of the last touch 1051. The folding area 1025 having the decreased area may include folding lines 1025a and 1025b corresponding to the decreased area. The adjacent folding areas 1001a and 1002a of the eleventh content image may also be changed to correspond to the folding area 1025 having the decreased area. The folding area 1025 having the decreased area may display a third content image 1004, the area of which is decreased. In addition, in response to continuous movement of the initial touch 1050, the control unit 110 may temporarily display a folding area (not shown) having a gradually decreased area compared with the folding area 1020. The folding area 1025 having the decreased area of FIGS. 12A and 12B are substantially the same as the folding area 1020 of FIG. 10C, and thus, a repeated description thereof will be omitted.

When continuous movement to the central line 1021a from a location of the initial touch 1050 is input, the control unit 110 may display a hidden folding area 1026, in response to arrival of the central line 1021a of the touch 1050. The hidden folding area 1026 may include the central line 1021*a* and symbols 1026*c* and 1026*d*.

The hidden folding area 1026 may include folding lines 1026*a* and 1026*b* corresponding to the decreased area. In response to the hidden folding area 1026, the adjacent areas 1001*a* and 1002*a* of the eleventh content image may be changed. In addition, in response to continuous movement to the central line 1021*a* of the touch 1050, the control unit 110 may temporarily display a folding area (not shown) having an area which is gradually reduced from the folding area 1020.

According to another embodiment of the present disclosure, changing from the folding area 1020 to the hidden folding area 1026 may occur not only by a user touch but also by elapse of predetermined time (for example, 500 ms) from initial display timing of the folding area 1020. That the predetermined time may be changed may be easily understood by those skilled in the art.

Referring to FIG. 10C, one folding area 1020 is displayed by the first touch 1010 detected from the bezel 10. When a plurality of touches are detected from the bezel 10, a plurality of folding area (not shown) corresponding to the plurality of touches may be displayed. For example, when one touch (not shown) is detected from the bezel 10, the control unit 110 displays one folding area (not shown) corresponding to one touch. By the folding area (not shown), sub content images (not shown) which are divided into two may be displayed. When another additional touch (not shown) is detected from the bezel 10, the control unit 110 may display other additional folding areas (not shown) corresponding to the other additional touches (not shown). In this case, the control unit 110 may display a total of three divided sub content images (not shown).

In operation S904 of FIG. 9, the twelfth touch is detected from the bezel.

Figure 10D:
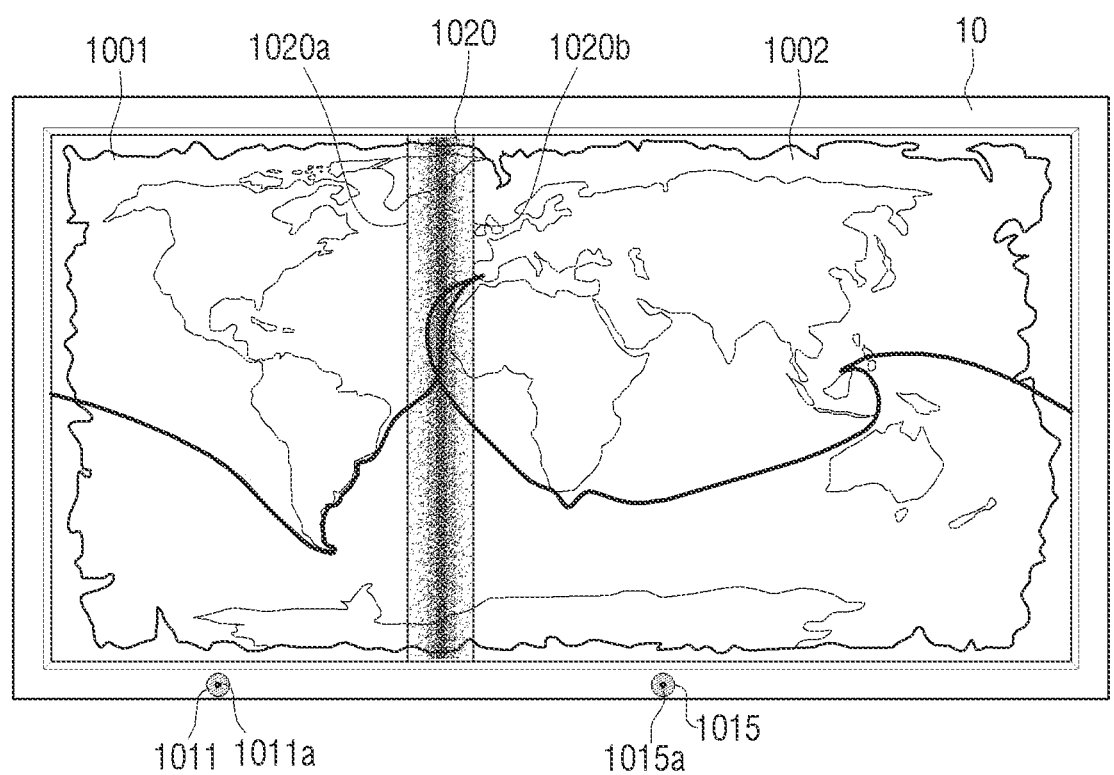

Referring to FIG. 10D, a user puts the twelfth touch 1011 and the thirteenth touch 1015 on the bezel 10 of the display apparatus 100 in which the eleventh content image 1000 is displayed. The control unit 110 may detect the twelfth touch 1011 and the thirteenth touch 1015 using the bezel touch sensor 141 and a touch controller (not shown). The control unit 110 may receive twelfth touch location information (for example, X12 and Y12 coordinates) of a twelfth touch location 1011*a* corresponding to the twelfth touch 1011 and thirteenth touch location information (for example, X13 and Y13 coordinates) of a thirteenth touch location 1015*a* corresponding to the thirteenth touch 1015 from the touch sensor controller.

The control unit 110 may store the twelfth touch location information corresponding to the twelfth touch location 1011*a* in a storage unit 185. The stored twelfth touch location information may further include ID for history management, a touch location, touch detection time, and a detection voltage (or current).

The control unit 110 may store the thirteenth touch location information corresponding to the thirteenth touch location 1015*a* in a storage unit 185. The stored thirteenth touch location information may further include ID for history management, a touch location, touch detection time, and a detection voltage (or current). The twelfth touch 1011 and the thirteenth touch 1015 may be generated by one of fingers including a thumb and/or a touchable input unit.

The control unit 110 may detect twelfth hovering (not shown) using the bezel touch sensor 141 and the touch sensor controller. The control unit 110 may receive twelfth hovering location information of a twelfth hovering location (not shown) corresponding to the twelfth hovering from the touch sensor controller. The control unit 110 may receive thirteenth hovering location information of a thirteenth hovering location (not shown) corresponding to the thirteenth hovering from the touch sensor controller.

The control unit 110 may store the twelfth hovering location information corresponding to the twelfth hovering location in the storage unit 185. The stored eleventh hovering location information may contain a hovering location, hovering detection time, or a detection voltage (or current). The control unit 110 may store the thirteenth hovering location information corresponding to the thirteenth hovering location in the storage unit 185. The stored thirteenth hovering location information may contain a hovering location, hovering detection time, or a detection voltage (or current). The twelfth hovering and the thirteenth hovering may be generated by one of fingers including a thumb or a touchable input unit.

Referring to FIG. 10D, a plurality of touches 1011 and 1015 are detected, but one touch (one of 1011 or 1015) may be detected. When one touch is detected, the control unit 110 may store touch location information corresponding to touch location of the detected one touch in a storage unit 185. In addition, when one hovering is detected, the control unit 110 may store hovering location information corresponding to hovering location which corresponds to detected one hovering may be stored in a storage unit 185.

In operation S905 of FIG. 9, the adjacent folding area of the eleventh (a) content image and the eleventh (b) content image moves to the folding area.

Figure 10E:
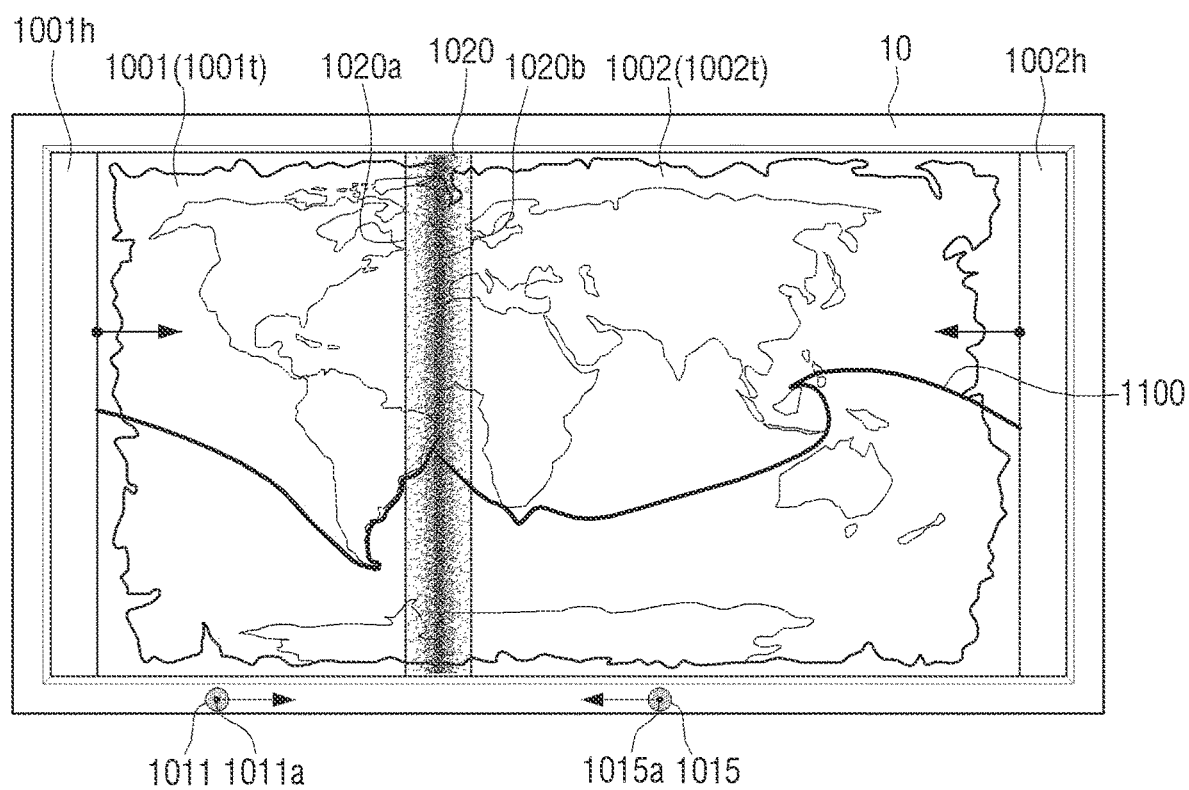
Figure 10F:
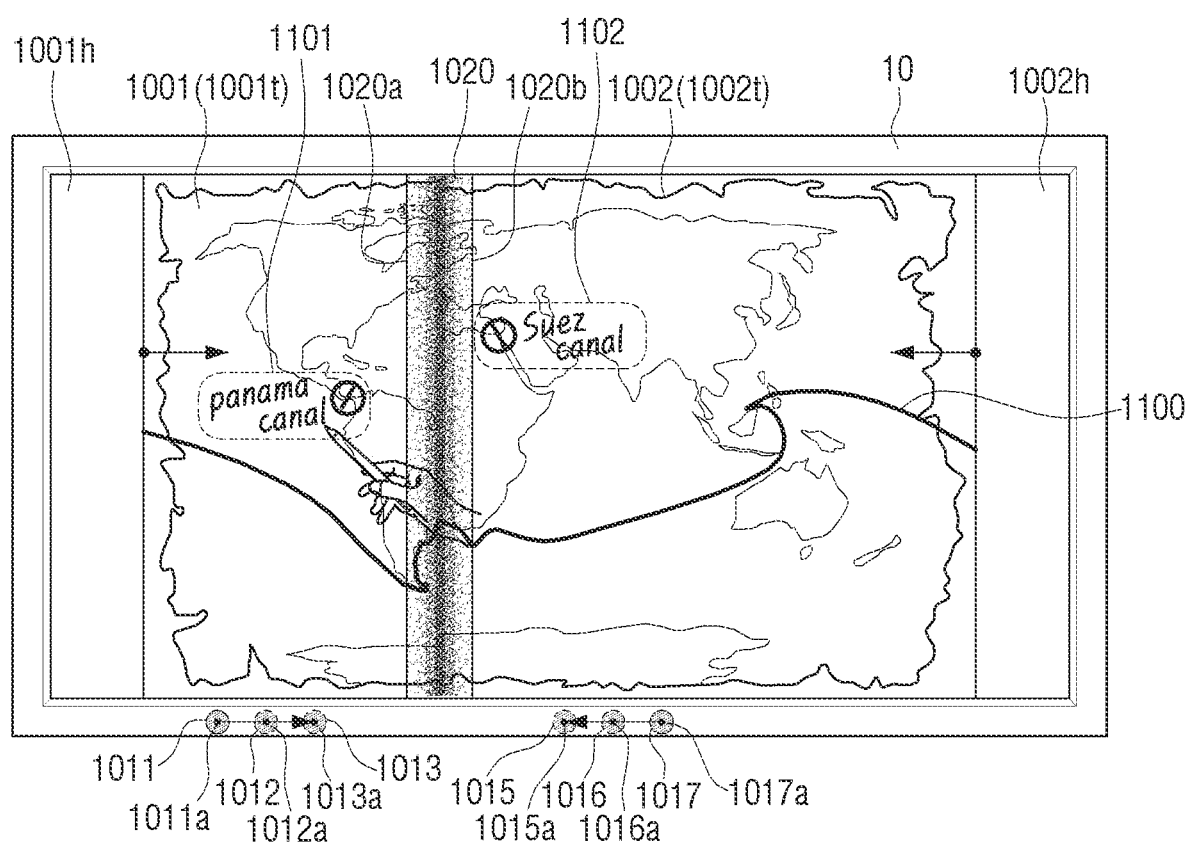

Referring to FIGS. 10E and 10F, the control unit 110 moves the first eleventh (a) content image 1001 to the folding area 1020 from the adjacent folding area 1001 of the eleventh (a) content image 1001 in response to holding time of the twelfth touch 1011. The control unit 110 may gradually reduce the area of the displayed eleventh (a) content image 1001 in response to increase in holding time of the twelfth touch 1011.

Movement of the eleventh (a) content image 1001 may include an effect whereby the eleventh (a) content image 1001 is wound around the folding area 1020 like a roll from an adjacent folding area 1001*a* of the eleventh (a) content image 1001 or an effect whereby the eleventh (a) content image 1001 is removed from the adjacent folding area 1001*a* of eleventh (a) content image 1001 to the folding area 1020. In addition, movement of the eleventh (a) content image 1001 may include the effect of winding of the eleventh (a) content image 1001 in a direction toward the central line 1021*a* from the adjacent area 1001*a* of the folding area 1020 such as a roll or the effect of disappear of the eleventh (a) content image 1001 in a direction toward the central line 1021*a* of the folding area 1020 from the adjacent area 1001*a* of the folding area.

Holding time of the twelfth touch 1011 may include continuous contact of the twelfth touch 1011 to the bezel 10 or continuous movement of the twelfth touch 1011. The control unit 110 may detect continuous movement (e.g., a plurality of X and Y coordinates corresponding to continuous movement of touch) of the twelfth touch 1010 using the bezel touch sensor 141 and the touch sensor controller. The control unit 110 may store location information of a plurality of touches corresponding to a plurality of touch locations (e.g., continuous movements from 1011*a* to 1013*a* via 1012*a*) corresponding to continuous movement of the twelfth touch 1011, in the storage unit 185. The continuous movement of the twelfth touch 1011 may refer to continuous holding of contact between the twelfth touch 1011 and a bezel 10.

Continuous movement of the twelfth touch 1011 refers to continuous touch gestures (e.g., drag or flick, movement to 1013a from 1011a via 1012a) of one touch to last twelfth touch 1013 from the initial twelfth touch 1011. In addition, continuous movement of the twelfth touch 1011 may refer to continuous touch gestures (e.g., movement to 1012a from 1011a) of one touch to an intermediate twelfth touch 1011 from the initial twelfth touch 1011. It would be easily understood by those of ordinary skill in the art that the twelfth touch gesture may include various touch gestures as well as rotation.

In the case of touch-on in which contact between the twelfth touch 1011 and the bezel 10 is maintained, the control unit 110 may move the eleventh (a) content image 1001 to a direction of the folding area 1020. In the case of touch-release in which contact between the twelfth touch 1011 and the bezel 10 is released, the control unit 110 may stop movement of the eleventh (a) content image 1001. When contact between the twelfth touch 1011 and the bezel 10 is released, it means that movement of the eleventh (a) content image 1001 is completed.

In response to holding time of the thirteenth touch 1015, the control unit 110 moves the eleventh (b) content image 1002 to the folding area 1020 from the adjacent folding area 1002a of the eleventh (b) content image 1002. In response to increase in holding time of the thirteenth touch 1015, the control unit 110 may gradually reduce the area of the displayed eleventh (b) content image 102.

Movement of the eleventh (b) content image 1002 may include an effect whereby the eleventh (b) content image 1002 is wound around the folding area 1020 like a roll from an adjacent folding area of the eleventh (b) content image 1002 or an effect whereby the eleventh content image 1002 is removed from the adjacent folding area 1002a of the eleventh content image 1002 to the folding area 1020. In addition, movement of the eleventh (b) content image 1002 may include an effect whereby the eleventh (b) content image 1002 is wound in a direction of the central line 1021a of the folding area 1020 like a roll from an adjacent folding area of the eleventh (b) content image 1002 or an effect whereby the eleventh content image 1002 is removed from the adjacent folding area 1002a of the eleventh content image 1002 to the folding area 1020.

In response to movement of the eleventh (a) content image 1001, the control unit 110 may change the thirteenth content image 1004 displayed on the folding area 1020 to a thirteenth content image 1004b. The thirteenth content image 1004 refers to a content image that is not changed in response to movement of the eleventh content image 1001 and 1002. The thirteenth content image 1004b refers to a content image that is changed in response to movement of the eleventh content image 1001.

A difference between the thirteenth content image 1004 and the thirteenth content image 1004b refers to a difference in a reference for winding or removing the eleventh content image 1001 and 1002. The eleventh content images 1001 and 1002 may be wound or removed based on the folding line 1020a. In this case, the thirteenth content image 1004 is not changed. In addition, the eleventh content image 1001 may be wound or removed in a direction of the central line 1021 by passing through the folding area 1020a. In this case, the thirteenth content image 1004b may be changed in response to winding and/or removing of the eleventh content image 1001.

When the eleventh (a) content image 1001 is moved, the path 1100 is moved together with the eleventh (a) content image 1001 based on an upper left apex. In addition, in response to movement of the eleventh content image 1001, when a portion of the eleventh (a) content image 1001 is not displayed, a portion of the path 1100 of the eleventh (a) content image 1001 that is not displayed may not be displayed.

In response to movement of the eleventh (a) content image 1001, the control unit 110 may display the twelfth blank space 1001h outside an edge of the eleventh (a) content image 1001. A length 1 of the twelfth blank space 1001h may be changed to correspond to the horizontal length of the display unit 170. According to an embodiment of the present disclosure, the length of the twelfth blank space 1001h may be $2/15$ of the horizontal length of the display unit 170. It would be easily understood by those of ordinary skill in the art that the length of the twelfth blank space 1001h may be changed by a manufacturer or a user.

The control unit 110 may display a transition content image 1001t in response to movement of the eleventh (a) content image 1001. The transition content image 1001t refers to the eleventh (a) content image 1001, an area of which is reduced as the eleventh (a) content image 1001 is moved in a direction toward the folding area 1020. An area of the transition content image 1001t is smaller than an area of the eleventh (a) content image 1001.

A moving speed of the eleventh (a) content image 1001 may be constant (e.g., 100 mm/s, changeable) or non-constant in response to holding time of the twelfth touch 1011. When the moving speed of the eleventh (a) content image 1001 is constant, the moving speed of the eleventh (a) content image 1001 is constant in response to the holding time of the twelfth touch 1011. When the moving speed of the eleventh (a) content image 1001 is non-constant, moving speed of the eleventh (a) content image 1001 may linearly increase and decrease like a sine curve (e.g., 0 m/s→200 m/s→0 m/s). In addition, when the moving speed of the eleventh (a) content image 1001 is non-constant, the moving speed of the eleventh (a) content image 1001 may promptly increase (e.g., up to ¼ of a period) and gradually decrease (e.g., up to 4/4 from ¼ of a period).

Referring to FIG. 10E, when holding time of the twelfth touch 1011 is increased, the control unit 110 may display a fourteenth content image (not shown) consecutively to the twelfth blank space 1001h. The fourteenth content image (not shown) may be displayed from an edge of the eleventh (a) content image 1001 that is wound or removed by the folding area 1020.

In addition, when holding time of the twelfth touch 1011 is increased, the control unit 110 may display only the twelfth blank space 1001h without the fourteenth content image (not shown). In this case, the length of the twelfth blank space 1001h may exceed $14/15$ of the horizontal length of the display unit 170. The length of the twelfth blank space 1001h may also be changed by a user or a manufacturer. An area of the twelfth blank space 1001h may be smaller than an area of the eleventh (a) content image 1001.

Holding time of the thirteenth touch 1015 may include continuous contact of the thirteenth touch 1015 to the bezel 10 or continuous movement of the thirteenth touch 1015. The control unit 110 may detect continuous movement (e.g., a plurality of X and Y coordinates corresponding to continuous movement of touch) of the thirteenth touch 1015 using the bezel touch sensor 141 and the touch sensor controller. The control unit 110 may store location information of a plurality of touches corresponding to a plurality of touch locations (e.g., continuous locations from 1015a to 1017a via 1016a) corresponding to continuous movement of the thirteenth touch 1015, in the storage unit 185. The continuous movement of the thirteenth touch 1015 may refer to continuous holding of contact between the thirteenth touch 1015 and a bezel 10.

Continuous movement of the thirteenth touch 1015 refers to continuous touch gestures (e.g., drag or flick, movement to 1017a from 1015a via 1016a) of one touch to last thirteenth touch 1015 from the initial thirteenth touch 1015. In addition, continuous movement of the thirteenth touch 1015 may refer to continuous touch gestures (e.g., movement to 1017a from 1015a via 1016a) of one touch to an intermediate thirteenth touch 1016 from the thirteenth touch 1015. It would be easily understood by those of ordinary skill in the art that the thirteenth touch gesture may include various touch gestures as well as rotation.

In the case of touch-on in which contact between the thirteenth touch 1015 and the bezel 10 is maintained, the control unit 110 may move the eleventh (b) content image 1002 in a direction of the folding area 1020. In the case of touch-release in which contact between the thirteenth touch 1015 and the bezel 10 is released, the control unit 110 may stop movement of the eleventh (b) content image 1002. When contact between the thirteenth touch 1015 and the bezel 10 is released, it means that movement of the eleventh (b) content image 1002 is completed.

In response to movement of the eleventh (b) content image 1002, the control unit 110 may change the thirteenth content image 1004 displayed on the folding area 1020 to a thirteen content image 1004c. The thirteenth content image 1004 refers to a content image that is not changed in response to movement of the eleventh content images 1001 and 1002. The thirteenth content image 1004c refers to a content image that is changed in response to movement of the eleventh (b) content image 1002.

A difference between the thirteenth content image 1004 and the thirteenth content image 1004c refers to a difference in a reference for winding or removing the eleventh content images 1001 and 1002. The eleventh content images 1001 and 1002 may be wound or removed based on the folding line 1020a. In this case, the thirteenth content image 1004 is not changed. In addition, the eleventh (b) content image 1002 may be wound or removed in a direction of the central line 1021 through the folding area 1020b. In this case, the thirteenth content image 1004 may be changed in response to winding and/or removing of the eleventh (b) content image 1002.

When the eleventh (b) content image 1002 is moved, the path 1100 is moved together with the eleventh (b) content image 1002 based on an upper left apex. In addition, in response to movement of the eleventh (b) content image 1002, when a portion of eleventh (b) content image 1002 is not displayed, a portion of the path 1100 of the eleventh (b) content image 1002 that is not displayed may not be displayed.

In response to movement of the eleventh (b) content image 1002, the control unit 110 may display the thirteenth blank space 1002h outside an edge of the eleventh (b) content image 1002. A length l of the thirteenth blank space 1002h may be changed to correspond to the horizontal length of the display unit 170. According to an embodiment of the present disclosure, the length of the thirteenth blank space 1002h may be $\frac{2}{15}$ of the horizontal length of the display unit 170. It would be easily understood by those of ordinary skill in the art that the length of the thirteenth blank space 1002h may be changed by a manufacturer or a user.

The control unit 110 may display a transition content image 1002t in response to movement of the eleventh (b) content image 1002. The transition content image 1002t refers to the eleventh (b) content image 1002, an area of which is reduced as the eleventh (b) content image 1002 is moved in a direction toward the folding area 1020. An area of the transition content image 1102t is smaller than an area of the eleventh (b) content image 1002.

A moving speed of the eleventh (b) content image 1002 may be constant (e.g., 100 mm/s, changeable) or non-constant in response to holding time of the thirteenth touch 1015. When the moving speed of the eleventh (b) content image 1002 is constant, the moving speed of the eleventh (b) content image 1002 is constant in response to the holding time of the thirteenth touch 1015. When the moving speed of the eleventh (b) content image 1002 is non-constant, moving speed of the eleventh (b) content image 1002 may linearly increase and decrease like a sine curve (e.g., 0 m/s→200 m/s→0 m/s). In addition, when the moving speed of the first content image 500 is non-constant, the moving speed of the eleventh (b) content image 1002 may promptly increase (e.g., up to $\frac{1}{4}$ of a period) and gradually decrease (e.g., up to 4/4 from $\frac{1}{4}$ of a period).

Referring to FIG. 10E, when holding time of the thirteenth touch 1015 is increased, the control unit 110 may display a fifteenth content image (not shown) consecutively to the thirteenth blank space 1002h. The fifteenth content image (not shown) may be displayed from an edge of the eleventh (b) content image 1002 that is wound or removed by the folding area 1020.

In addition, when holding time of the thirteenth touch 1011 is increased, the control unit 110 may display only the thirteenth blank space 1002b without the fifteenth content image (not shown). In this case, the length of the twelfth blank space 1001h may not exceed $\frac{14}{15}$ of the horizontal length of the display unit 170. The length of the thirteenth blank space 1002b may also be changed by a user or a manufacturer. An area of the thirteenth blank space 1002h may be smaller than an area of the eleventh (b) content image 1002.

In operation S906 of FIG. 9, when movement is completed, an eleventh (c) content image is displayed.

Referring to FIGS. 10E and 10F, a user releases the twelfth touch 1011 from the bezel 10. The control unit 110 may detect the release (e.g., a case in which additional continuous movement of the twelfth touch 1015 is not detected) of the twelfth touch 1011 using the bezel touch sensor 141 and the touch sensor controller. The control unit 110 may store location information of a last twelfth touch location 1013a corresponding to the release location (e.g., the last twelfth touch location 1013a) of the twelfth touch 1010 in the storage unit 185.

When movement of the eleventh (a) content image 1001 is completed, the control unit 110 displays an eleventh (c) content image 1001f. The release of the twelfth touch 1011 may include release of the twelfth touch 1011 from the bezel 10 or stop of continuous movement of the twelfth touch 1011 from the bezel 10.

When the twelfth touch 1011 is released, the control unit 110 may stop movement of the eleventh (a) content image 1001. The eleventh (c) content image 1001f refers to the eleventh (a) content image 1101, movement of which is stopped.

The control unit 110 may not suddenly display the eleventh (c) content image 1001f. When the twelfth touch 1011 is released and movement of the eleventh (a) content image 1001 is stopped, the eleventh (a) content image 1001, movement of which is stopped, is the eleventh (c) content image 1001f. In addition, when the eleventh touch 1011 is released and movement of the transition content image 1001*t* is stopped, the transition content image 1001*f*, movement of which is stopped, may be the eleventh (c) content image 501.

In response to release of the twelfth touch 1011, an area of the eleventh (c) content image 1001*f* is changed. The eleventh (c) content image 1001*f* may have a minimum area that is not changed even if holding time of the twelfth touch 1011 increases. Even if holding time of the twelfth touch 1011 is increased, the minimum area of the eleventh (c) content image 1001*f* may be the same a set minimum area. According to an embodiment of the present disclosure, the minimum area of the eleventh (c) content image 1001*f* may be ³⁄₁₅ of an area of the display unit 170. According to another embodiment of the present disclosure, the minimum area of the eleventh (c) content image 1001*f* may be ¹⁄₁₅ of the display unit 170. It would be easily understood by those of ordinary skill in the art that the minimum area of the eleventh (c) content image 1001*f* is changed by a manufacturer or a user.

The control unit 110 may provide feedback to the user in response to display of the eleventh (c) content image 1001*f*. The provided feedback may be one of visual feedback and audible feedback and may be provided to the user. The control unit 110 may provide both visual feedback and audible feedback to the user.

Visual feedback may be displayed by showing a visual effect (e.g., an animation effect such as a separate image or fading applied to a separate image) responding to display of the eleventh (c) content image 1001*f* differentially from a plurality of objects displayed on the display unit 170. Audible feedback may be output through the audio output unit 180 as sound responding to display of the eleventh (c) content image 1001*f*.

When the touch panel 175 of the display apparatus 100 is the capacitive type touch panel 176 or the resistive type touch panel 177, the control unit 110 may provide tactile feedback to the user using a vibration motor (not shown).

In environment settings of a portable device, feedback (for example, visual feedback and audible feedback) to be provided may be selected and/or changed. In addition, time (e.g., 500 msec) to provide at least one feedback to the user may be input and/or changed by the user.

Referring to FIGS. 10E and 10F, a user releases the thirteenth touch 1015 from the bezel 10. The control unit 110 may detect the release (e.g., a case in which additional continuous movement of the thirteenth touch 1015 is not detected) of the thirteenth touch 1015 using the bezel touch sensor 141 and the touch sensor controller. The control unit 110 may store location information of a last thirteenth touch location 1015*a* corresponding to the release location (e.g., the last thirteenth touch location 1013*a*) of the thirteenth touch 1015 in the storage unit 185.

When movement of the eleventh (b) content image 1002 is completed, the control unit 110 displays an eleventh (d) content image 1002*f*. The release of the thirteenth touch 1015 may include release of the thirteenth touch 1015 from the bezel 10 or stop of continuous movement of the twelfth touch 1011 from the bezel 10.

When the thirteenth touch 1015 is released, the control unit 110 may stop movement of the eleventh (b) content image 1002. The eleventh (d) content image 1002*f* refers to the eleventh (b) content image 1102, movement of which is stopped.

The control unit 110 may not suddenly display the eleventh (b) content image 1002*f*. When the thirteenth touch 1015 is released and movement of the eleventh (b) content image 1002 is stopped, the eleventh (b) content image 1002, movement of which is stopped, is the eleventh (d) content image 1002*f*. In addition, when the thirteenth touch 1015 is released and movement of the transition content image 1002*t* is stopped, the transition content image 1002*f*, movement of which is stopped, may be the eleventh (d) content image 1002*f*.

In response to release of thirteenth touch 1015, an area of the eleventh (d) content image 1002*f* may be changed. The eleventh (d) content image 1002*f* may have a minimum area that is not changed even if holding time of the thirteenth touch 1015 increases. Even if holding time of thirteenth touch 1015 is increased, the minimum area of the eleventh (d) content image 1002*f* may be the same a set minimum area. According to an embodiment of the present disclosure, the minimum area of the eleventh (d) content image 1002*f* may be ³⁄₁₅ of an area of the display unit 170. According to another embodiment of the present disclosure, the minimum area of the eleventh (d) content image 1002*f* may be ¹⁄₁₅ of the display unit 170. It would be easily understood by those of ordinary skill in the art that the minimum area of the eleventh (d) content image 1002*f* is changed by a manufacturer or a user.

The control unit 110 may provide feedback to the user in response to display of the eleventh (d) content image 1002*f*. The provided feedback may be one of visual feedback and audible feedback and may be provided to the user. The control unit 110 may provide both visual feedback and audible feedback to the user.

Visual feedback may be displayed by showing a visual effect (e.g., an animation effect such as a separate image or fading applied to a separate image) responding to display of the eleventh (d) content image 1002*f* differentially from a plurality of objects displayed on the display unit 170. Audible feedback may be output through the audio output unit 180 as sound responding to display of the eleventh (d) content image 1002*f*.

When the touch panel 175 of the display apparatus 100 is the capacitive type touch panel 176 or the resistive type touch panel 177, the control unit 110 may provide tactile feedback to the user using a vibration motor (not shown).

In environment settings of a portable device, feedback (for example, visual feedback and audible feedback) to be provided may be selected and/or changed. In addition, time (e.g., 500 msec) to provide at least one feedback to the user may be input and/or changed by the user.

When the sub content images 1001 and 1002 which are divided based on the folding area 1020 move in a direction of the central line 1021*a* of the folding area 1020 by a user touch or touch gesture, a user may move the divided images 1001 and 1002 to a desired location respectively and give a lecture.

The user may additionally input a location and name 1101 of the Panama Canal to the display world map using a finger including a thumb or an input unit. When the location and name 1101 of the Panama Canal is input to an infrared type touch panel, the control unit 110 may display and overlay a line and text corresponding to continuous movement of detected touch on the world map. In addition, a user may additionally input location and name 1102 of the Suez Canal on the world map by using the finger including the thumb or an input unit. When the location and name 1102 of the Suez Canal are input on the infrared type touch panel, the control unit 110 may display and overlay a line and text corresponding to continuous movement of detected touch on the world map.

In operation S907 of FIG. 9, double tap is detected from a second content image or a bezel.

Figure 10G:
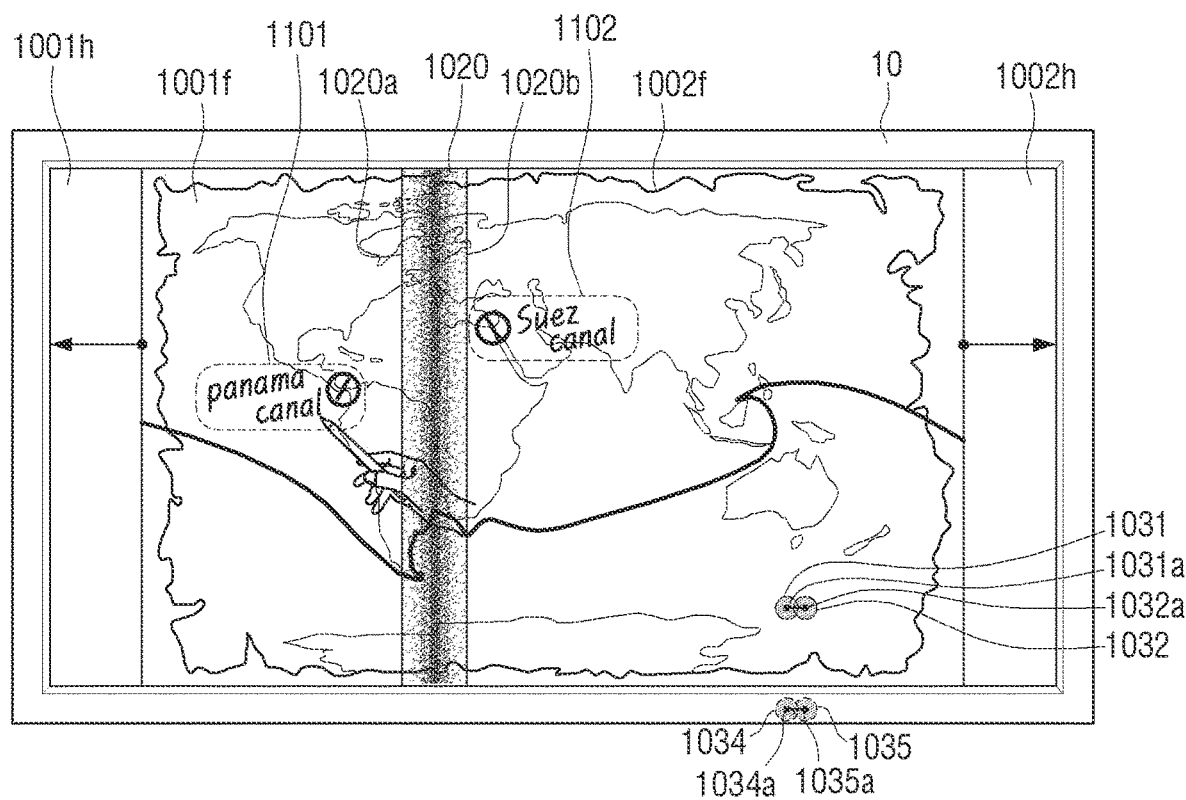

Referring to FIG. 10G, the user inputs one of double taps 1034 and 1035 to the eleventh (d) content image 1002*f* and double taps 1031 and 1032 to the bezel 10. The control unit 110 may detect the double taps 1031 and 1032 on the eleventh (d) content image 1002*f* using the infrared type touch panel 178 and the touch panel controller. In addition, the control unit 110 may receive double tap touch location information (e.g., a plurality of X and Y coordinates) of double tap locations 1031*a* and 1032*a* corresponding to the double taps 1031 and 1032 of the eleventh (d) content image 1002*f* from the touch panel controller.

The control unit 110 may detect the double taps 1034 and 1035 using the bezel touch sensor 141 and the touch sensor controller. The control unit 110 may receive double tap touch location information (e.g., a plurality of X and Y coordinates) of double tap locations 1034*a* and 1035*a* corresponding to the double taps 1034 and 1035 from the touch sensor controller. The control unit 110 may store double tap location information corresponding to the double tap locations 1031*a*, 1032*a*, 1034*a*, and 1035*a* in the storage unit 185. Double tap may be generated by one of fingers including a thumb or a touchable input unit.

In addition, a user may input on the eleventh (c) content image 1001*f* the double taps (not shown) and one of the double taps 1034 and 1035 on the bezel 10. Detection of the double taps (not shown) on the eleventh (c) content image 1001*f* is substantially the same as detection of the double taps 1031 and 1032 on the eleventh (d) content image 1002*f*, and thus, a detailed description thereof will be omitted.

When one of the double taps 1031 and 1032 from the eleventh (d) content image 1002*f* and the double taps 1034 and 1035 from the bezel 10 is not detected, the method proceeds to operation S909.

In operation S908 of FIG. 9, a current image is restored to the eleventh content image.

Figure 10H:
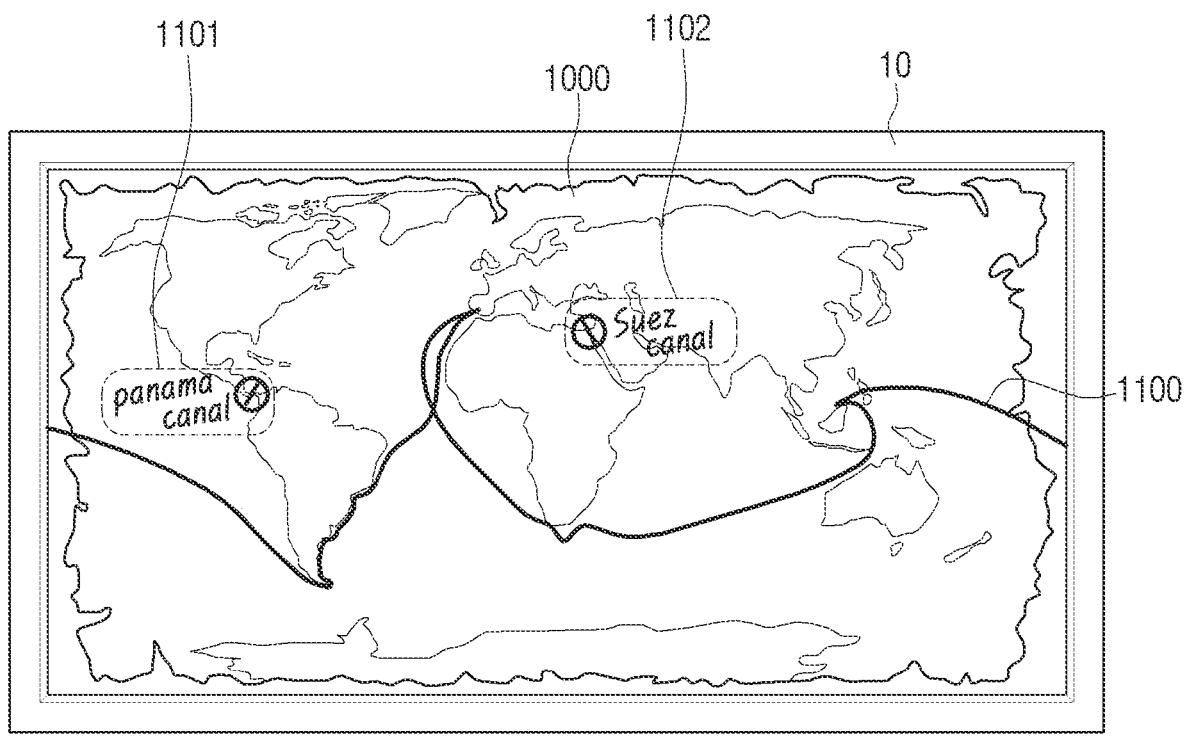

Referring to FIGS. 10G and 10H, when one of the double taps 1031 and 1032 from the eleventh (d) content image 1002*f*, double taps (not shown) from the eleventh (c) content image 1001*f*, and the double taps 1034 and 1035 from the bezel 10 is detected, the control unit 110 restores the eleventh (d) content image 1002*f* and the eleventh (c) content image 1101*f* to the eleventh content image 1000. When one of the double taps 1031 and 1032 from the eleventh (d) content image 1002*f*, the double taps (not shown) from the eleventh (c) content image 1001*f*, and the double taps 1034 and 1035 from the bezel 10, the control unit 110 may move the eleventh (d) content image 1002*f* and the eleventh (c) content image 1001*f* in an opposite direction to the folding area 1020. When eleventh (d) content image 1002*f* and the eleventh (c) content image 1001*f* are moved, eleventh (d) content image 1002*f* and the eleventh (c) content image 1001*f* may be transition content images 1002*t* and 1001*t*.

Movement of the eleventh (d) content image 1002*f* and the eleventh (c) content image 1001*f* may refer to movement of an upper left apex like movement of the eleventh (a) content image 1001 and the eleventh (b) content image 1002. When the eleventh (d) content image 1002*f* and the eleventh (c) content image 1001*f* are moved, the control unit 110 may move the path 1100 and the location and name 1101 of the Panama Canal and location and name 1102 of the Suez Canal that are additionally input to the eleventh (d) content image 1002*f* and the eleventh (c) content image 1001*f* together.

When the eleventh (d) content image 1002*f* is restored to the eleventh (a) content image 1001, the control unit 110 may display the location and name 1101 of the Panama Canal together with the eleventh (a) content image 1101. When the eleventh (d) content image 1002*f* is restored to the eleventh (b) content image 1002, the control unit 110 may display the location and name 1102 of the Suez Canal together with the eleventh (b) content image 1002.

Moving speed of the transition content image 1001 may be the same or different from moving speed of the eleventh (a) content image 1001. Moving speed of the transition content image 10025 may be the same or different from moving speed of the eleventh (b) content image 1002.

When the eleventh (d) content image 1002*f* is restored to the eleventh content images 1001 and 1002, the control unit 110 may remove the folding area 1020. In addition, the control unit 110 may also remove the folding lines 1020*a* and 1020*b*.

The control unit 110 may provide feedback responding to movement of the eleventh (d) content image 1002*f* to the user. Feedback of operation S908 of FIG. 9 is substantially the same as operation S406 of FIG. 4, and thus, a repeated description thereof will be omitted.

In operation S908 of FIG. 9, when the eleventh content image is displayed, the method of displaying an image by the display apparatus is terminated.

When the method returns to operation S907 of FIG. 9, if both double tap from the eleventh (c) and eleventh (d) content images and double tap from the bezel are not detected, operation S909 proceeds.

In operation S909 of FIG. 9, fourteenth touch is detected from the bezel.

Figure 11A:
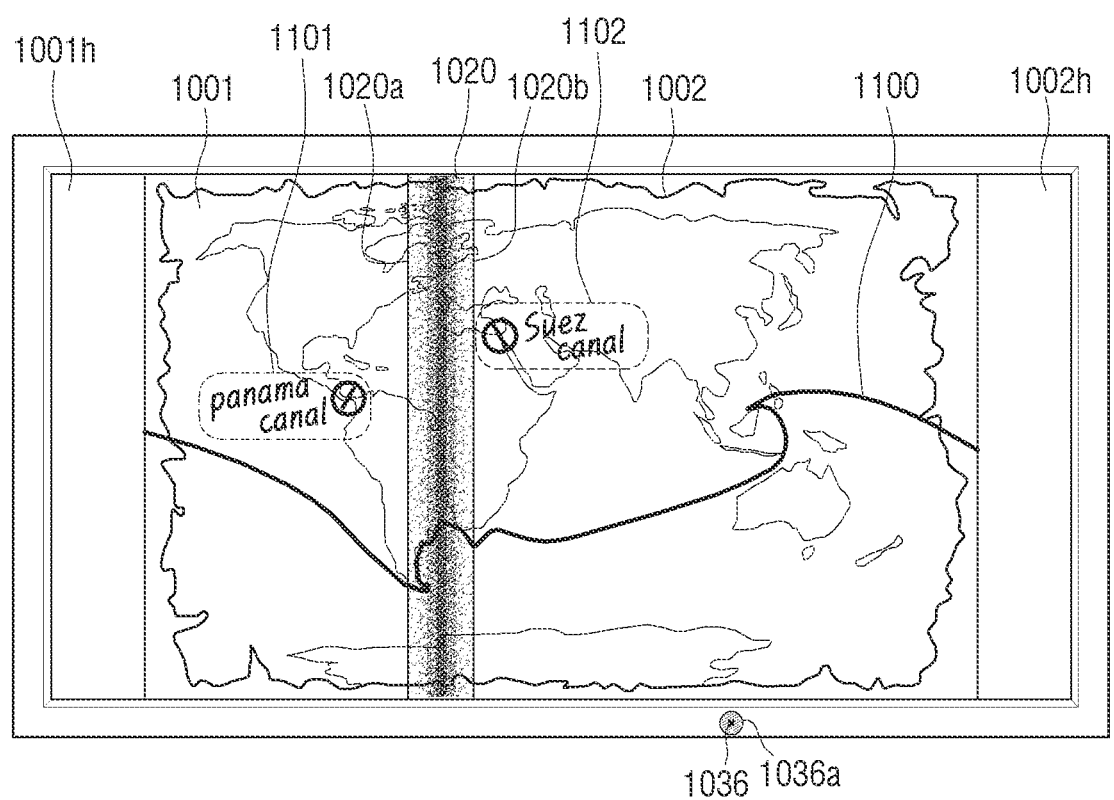
FIGS. 11A and 11B illustrate examples of a screen of a display apparatus according to various embodiments of the present disclosure.

Referring to FIG. 11A, the user puts fourteenth touch 1036 on the bezel. The control unit 110 may detect the fourteenth touch 1036 from the bezel. The control unit 110 may detect the fourteenth touch 1036 using the bezel touch sensor 141 and the touch sensor controller. The control unit 110 may receive second touch location information (e.g., X and Y coordinates) of fourteenth touch location 1036*a* corresponding to the fourteenth touch 1036 from the touch sensor controller. The control unit 110 may store the second touch location information corresponding to the fourteenth touch location 1036*a* in the storage unit 185.

Touch or hovering of operation S909 of FIG. 9 is substantially the same as operation S902 of FIG. 9, and thus, a repeated description thereof will be omitted.

In operation S909 of FIG. 9, when the fourteenth touch is not detected from the bezel, a method of displaying an image by the display apparatus is terminated.

In operation S910 of FIG. 9, an area of the eleventh (d) content image is changed.

Figure 11B:
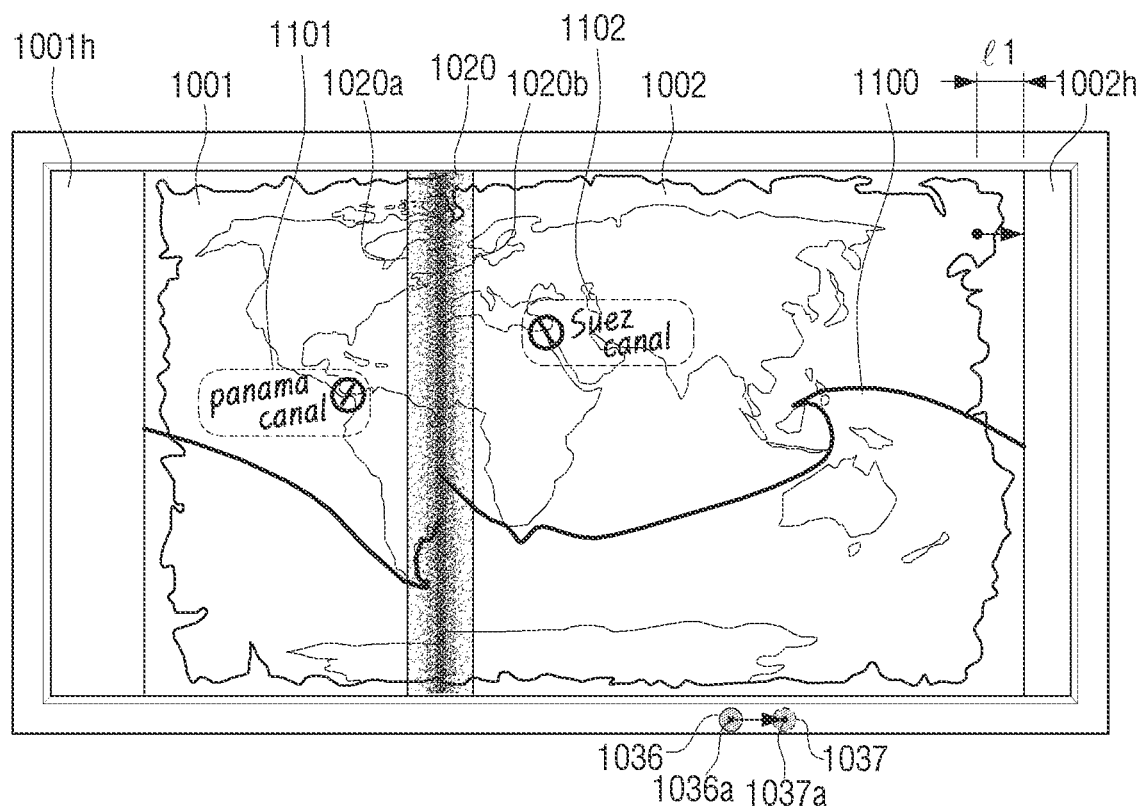

Referring to FIG. 11B, the control unit 110 moves the eleventh (d) content image 1002*f* in an opposite direction to the folding area 1020 in response to holding time of the fourteenth touch 1036. The control unit 110 may gradually increase the area of the displayed eleventh (d) content image 1002*f* in response to holding time of increase in holding time of the fourteenth touch 1036. The area of the thirteenth content image 1002*h* may be reduced in response to increase in holding time of the fourteenth touch 1036.

Movement of eleventh (d) content image 1002*f* may include unwinding a partial area of the wound eleventh (b) content image 1002 from the folding area 1020 or displaying a partial area of the removed eleventh content image 1002 from the folding area 1020.

Holding time of the fourteenth touch 1036 may include continuous contact of the fourteenth touch 1036 to the bezel 10 or continuous movement (e.g., movement to 1037*a* from 1036*a*) of the fourteenth touch 1036.

Release of the fourteenth touch 1036 may include release of the fourteenth touch 1036 from the bezel 10 or release of continuous movement of the fourteenth touch 1036 from the bezel 10. When the fourteenth touch 1036 is released, the control unit 110 may stop movement of the second content image (or a transition content area).

Referring to FIGS. 11A and 11B, the area of the eleventh (d) content image 1002f is increased by as much as a moving length l1. The control unit 110 may display of the location and name 1102 of the Suez Canal together with the eleventh (d) content image 1002f, the area of which is increased.

In operation S910 of FIG. 9, holding time of touch, release of touch, and change in area of content image are substantially the same as operations S905 and S906 of FIG. 9, and thus, a repeated description thereof will be omitted.

In operation S910 of FIG. 9, when the area of the eleventh (d) content image is changed, the method of displaying an image by the display apparatus is terminated.

Various embodiments of the present disclosure may include a computer readable medium including program commands for executing operations implemented through various computers. The computer readable medium may store program commands, data files, data structures or combinations thereof. For example, the computer readable medium may include, for example, a volatile or non-volatile storage device, a memory such as a RAM, a memory chip, a device or an integrated circuit, an optically or magnetically recordable and computer readable storage medium, such as a Compact Disc (CD), a Digital Video Disk (DVD), a magnetic disk, or a magnetic table, irrespective of whether data is removable or re-writable. It may be understood that the storage unit 185 included in the display apparatus is an example of a machine readable storage medium appropriate for storing a program including commands for embodying embodiments of the present disclosure or programs. The program command recorded in the medium may be particularly designed or configured for embodiments of the present disclosure or may be known and used by those of ordinary skill in the computer software field.

According to various embodiments of the present disclosure, a display apparatus and a method of displaying an image by the display apparatus may control movement of a content image in response to touch detected from a bezel and/or continuous movement of the touch.

According to various embodiments of the present disclosure, a display apparatus and a method of displaying an image by the display apparatus may display a folding area at an edge of a content image in response to touch detected from a bezel and/or continuous movement of the touch.

According to various embodiments of the present disclosure, a display apparatus and a method of displaying an image by the display apparatus may change an area of a displayed content image in response to touch detected from a bezel and/or continuous movement of a touch gesture.

According to various embodiments of the present disclosure, a display apparatus and a method of displaying an image by the display apparatus may change an area of a displayed folding line in response to touch detected from a bezel and/or continuous movement of the touch.

According to various embodiments of the present disclosure, a display apparatus and a method of displaying an image by the display apparatus may control a moving speed of a content image in response to touch detected from a bezel and/or continuous movement of the touch.

According to various embodiments of the present disclosure, a display apparatus and a method of displaying an image by the display apparatus may provide feedback to a user in response to a content image that is moved to correspond to touch detected from a bezel and/or continuous movement of the touch.

According to various embodiments of the present disclosure, a display apparatus and a method of displaying an image by the display apparatus may change a location of a folding area displayed on an edge of a content image in response to touch detected from a bezel.

According to various embodiments of the present disclosure, a display apparatus and a method of displaying an image by the display apparatus may change a content image displayed on a folding area at an edge of the content image in response to touch detected from a bezel and/or continuous movement of the touch.

The various embodiments of the present disclosure are not limited to the aforementioned features. According to various embodiments of the present disclosure, a display apparatus and a method of displaying an image by the display apparatus may control movement of a content image in response to touch detected from a bezel and/or continuous movement of the touch.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying an image by a display apparatus, the method comprising:
   displaying a first content image on the display apparatus;
   detecting a first touch on a bezel of the display apparatus, the first touch comprising a plurality of touch points and being toward a corner of the display apparatus;
   in response to the first touch, moving the first content image in a direction determined by the first touch and displaying a second content image which is changed in size in comparison with the first content image;
   wherein, in response to the first touch being detected on a first area of the bezel, the second content image is an image which is moved in a first direction of the display apparatus and in response to the first touch being detected on a second area of the bezel, the second content image is an image which is moved in a second direction of the display apparatus, and
   wherein the first area is different from the second area, and the first direction is different from the second direction;
   detecting a double tap on the bezel of the display apparatus after the first touch being released; and
   based on the double tap, restoring the second content image to the first content image.

2. The method as claimed in claim 1, further comprising:
   displaying the second content image as a portion of the first content image when the moving is completed.

3. The method as claimed in claim 2, wherein the second content image comprises a second edge of the first content image, which is positioned at an opposite side to the moving.

4. The method as claimed in claim 2, further comprising:
   detecting a third touch on the bezel; and
   changing an area of the second content image in response to a location of the third touch.

5. The method as claimed in claim 2, further comprising:
   displaying a folding area on a first edge of the first content image in response to a location of the first touch,
   wherein the folding area and an adjacent folding area of the first content image are differentiated from each other by a folding line.

6. The method as claimed in claim 5, wherein the folding area has a changeable area.

7. The method as claimed in claim 5, wherein the folding area is positioned at one of four edge portions of the first content image.

8. The method as claimed in claim 5, wherein the displaying of the second content image which is moved comprises:
moving the first content image by winding the first content image around the folding area; or
removing the first content image from the adjacent folding area of the first content image at the folding area.

9. The method as claimed in claim 8, further comprising:
changing a third content image displayed on the folding area in response to movement of the first content image.

10. The method as claimed in claim 2, further comprising:
restoring the second content image to the first content image when a touch gesture is detected on the second content image.

11. The method as claimed in claim 10, further comprising:
receiving writing on a whiteboard on the second content image,
wherein the writing on the whiteboard is displayed together with the second content image or is displayed together with the first content image when the touch gesture is detected from the second content image.

12. The method as claimed in claim 1, wherein a moving speed of the first content image is constant or non-constant in response to a holding time of the first touch.

13. The method as claimed in claim 1, further comprising:
outputting at least one of visual feedback or audible feedback in response to the moving.

14. The method as claimed in claim 1,
wherein the first content image is spaced from the second content image by a blank space, and
wherein the first content image, the blank space, and second content image are moved together in the direction determined by the first touch.

15. A method of displaying an image by a display apparatus, the method comprising:
displaying a first content image on the display apparatus;
detecting a first touch on a bezel of the display apparatus, the first touch comprising a plurality of touch points and being toward a corner of the display apparatus;
in response to the first touch, moving the first content image in a direction determined by the first touch and displaying a second content image which is changed in size in comparison with the first content image;
displaying the second content image when the moving is completed,
wherein, in response to the first touch being detected on a first area of the bezel, the second content image is an image which is moved in a first direction of the display apparatus and in response to the first touch being detected on a second area of the bezel, the second content image is an image which is moved in a second direction of the display apparatus, and
wherein the first area is different from the second area, and the first direction is different from the second direction;
detecting a double tap on the bezel of the display apparatus after the first touch being released; and
based on the double tap, restoring the second content image to the first content image.

16. The method as claimed in claim 15, further comprising:
displaying a folding area on a first edge of the first content image in response to a location of the first touch,
wherein the folding area is positioned at one of four edge portions of the first content image.

17. A display apparatus comprising:
a display;
a bezel surrounding the display and comprising a bezel touch sensor; and
at least one processor configured to control the display and the bezel touch sensor,
wherein the at least one processor is further configured to:
control the display to display a first content image,
in response to a first touch detected via the bezel touch sensor and being toward a corner of the display apparatus, move the first content image in a direction determined by the first touch and display a second content image which is changed in size in comparison with the first content image, wherein the first touch comprises a plurality of touch points,
wherein, in response to the first touch being detected on a first area of the bezel, the second content image is an image which is moved in a first direction of the display apparatus and in response to the first touch being detected on a second area of the bezel, the second content image is an image which is moved in a second direction of the display apparatus, and
wherein the first area is different from the second area, and the first direction is different from the second direction,
based on a double tap detected on the bezel of the display apparatus after the first touch being released, restore the second content image to the first content image.

18. The display apparatus as claimed in claim 17, wherein the at least one processor is further configured to control the display to display the second content image as a portion of the first content image when the moving is completed.

19. The display apparatus as claimed in claim 17, wherein the bezel touch sensor comprises one of a bar type resistive touch sensor or a bar type capacitive touch sensor.

20. The display apparatus as claimed in claim 17, wherein the bezel touch sensor is formed on at least one of a front surface or a side surface of the bezel.

21. A display apparatus comprising:
a display;
a bezel surrounding the display and comprising a bezel touch sensor; and
at least one processor configured to control the display and the bezel touch sensor,
wherein the at least one processor is further configured to:
control the display to display a first content image,
in response to a first touch detected via the bezel touch sensor and being toward a corner of the display apparatus, move the first content image in a direction determined by the first touch and display a second content image which is changed in size in comparison with the first content image, wherein the first touch comprises a plurality of touch points,
control the display to display the second content image when the moving is completed,
wherein, in response to the first touch being detected on a first area of the bezel, the second content image is an image which is moved to a first direction of the display apparatus and in response to the first touch being detected on a second area of the bezel, the second content image is an image which is moved to a second direction of the display apparatus, and wherein the first area is different from the second area, and the first direction is different from the second direction,
detect a double tap on the bezel of the display apparatus after the first touch being released, and
based on the double tap, restore the second content image to the first content image.

\* \* \* \* \*